(12) United States Patent
Takaku et al.

(10) Patent No.: US 6,725,709 B2
(45) Date of Patent: Apr. 27, 2004

(54) COMBUSTION STATE DIAGNOSING SYSTEM AND COMBUSTION STATE DIAGNOSING METHOD FOR DIAGNOSING ENGINE AND RECORDING MEDIUM

(75) Inventors: Yutaka Takaku, Mito (JP); Toshio Ishii, Mito (JP); Nobuo Kurihara, Hachinohe (JP); Hiroshi Kimura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/000,356

(22) Filed: Dec. 5, 2001

(65) Prior Publication Data

US 2002/0056315 A1 May 16, 2002

Related U.S. Application Data

(63) Continuation of application No. 09/104,933, filed on Jun. 26, 1998.

(30) Foreign Application Priority Data

Jun. 27, 1997 (JP) .............................................. 9-172195

(51) Int. Cl.$^7$ .............................................. G01M 19/00
(52) U.S. Cl. ..................................................... 73/117.3
(58) Field of Search ................................ 73/117.3, 115; 364/424.03

(56) References Cited

U.S. PATENT DOCUMENTS 5,485,374 A * 1/1996 Takaku et al. ......... 364/424.03
5,513,520 A * 5/1996 Kuroda ..................... 73/117.3

* cited by examiner

Primary Examiner—Edward Lefkowitz
Assistant Examiner—Octavia Davis
(74) Attorney, Agent, or Firm—Crowell & Moring LLP

(57) ABSTRACT

A combustion state is diagnoses by extracting specific rotation period component of a period synchronous with rotation from a combustion state parameter for at least two rotations. The combustion state is judged on the basis of the extracted specific rotation period component. The combustion state parameter may be the engine speed or the output torque of a multiple-cylinder engine which varies according to the combustion state of the engine.

14 Claims, 19 Drawing Sheets

FIG. 8

○ NORMAL
● MISFIRE

| MISFIRING PATTERN NO. | MISFIRING PATTERN |
|---|---|
| 1 (NORMAL) | ○ ○ ○ ○ ○ ○ ○ ○ |
| 2 | ● ○ ○ ○ ○ ○ ○ ○ |
| 3 | ● ● ○ ○ ○ ○ ○ ○ |
| 4 | ● ○ ● ○ ○ ○ ○ ○ |
| 5 | ● ○ ○ ● ○ ○ ○ ○ |
| 6 | ● ○ ○ ○ ● ○ ○ ○ |
| 7 | ● ● ● ○ ○ ○ ○ ○ |
| 8 | ● ● ○ ● ○ ○ ○ ○ |
| 9 | ● ● ○ ○ ● ○ ○ ○ |
| 10 | ● ● ○ ○ ○ ● ○ ○ |
| 11 | ● ● ○ ○ ○ ○ ● ○ |
| 12 | ● ○ ● ○ ● ○ ○ ○ |
| 13 | ● ○ ● ○ ○ ○ ● ○ |

TWO-ROTATIONS

MISFIRING PATTERN NO. 2
(LOW-FREQUENCY MISFIRING)

MISFIRING PATTERN NO. 4
(LOW-FREQUENCY MISFIRING)

MISFIRING PATTERN NO. 6
(LOW-FREQUENCY MISFIRING)

COMBUSTION STATE DIAGNOSING SYSTEM AND COMBUSTION STATE DIAGNOSING METHOD FOR DIAGNOSING ENGINE AND RECORDING MEDIUM

This application is a continuation of application Ser. No. 09/104,933, filed Jun. 26, 1998.

BACKGROUND OF THE INVENTION

The present invention relates to a combustion state diagnosing system for diagnosing the combustion state of a multiple-cylinder engine and, more particularly, to a combustion state diagnosing system and a combustion state diagnosing method capable of accurately finding the occurrence of a misfire.

If an engine misfires, expected energy of combustion cannot be produced, the output of the engine decreases, and unburned gasses are discharged into an exhaust system to cause various problems. For example, the unburned gasses discharged into the atmosphere cause air pollution. Furthermore, part of the unburned gases burn in a catalytic unit included in the exhaust system and heats the exhaust system at an abnormally high temperature, which may possibly cause the catalytic unit to melt. If the catalytic unit melts, the exhaust gas cannot be purified, causing air pollution.

To prevent such air pollution, the ARB (Air Resources Board) of California, USA provides by regulations that misfires shall be detected and, if the frequency of misfires exceeds a predetermined value, malfunction codes shall be stored and information shall be given to that effect to the driver by lighting up a malfunction indicator light. A threshold frequency of misfires in such a case must be determined taking into consideration a frequency detrimental to the exhaust gas (frequency of misfires in 1000 rotations of the crankshaft of the engine) and a frequency detrimental to the catalytic unit (frequency of misfires in 200 rotations of the crankshaft of the engine). The concrete value of the threshold frequency of misfires is dependent on the type of the vehicle and the property of the exhaust gas provided by relevant regulations. For example, about 2% of a low frequency of misfires must be sensed, which corresponds to 80 misfires per 1000 rotations of the crankshaft of an 8-cylinder engine. Suppose that misfires occur in such a frequency in one cylinder, a malfunction indicator light must be turned on if the frequency of misfires in 500 ignition cycles is eighty. The upper limit of an operating range in which misfires must be detected was raised from an upper limit on the order of 3000 rpm to the maximum engine speed on the order of 6000 rpm. The regulations require the detection of misfires in a wide range of a no-load condition to a full-load condition.

The following prior arts are available for detecting misfires in engines.

Disclosed in Japanese Patent Laid-open No. 4-19344 is an apparatus which detects abnormal combustion on the basis of the magnitudes of components for frequencies determined through the frequency analysis of engine speed information.

Disclosed in Japanese Patent Laid-open No. 6-58196 is an apparatus for detecting misfires and judging cylinders in which misfires occurred, in which the apparatus comprises a torque measuring means for measuring the instantaneous magnitude of the output torque of an engine, a specific frequency component extracting means for extracting a predetermined specific frequency component from the measured output torque measured by the torque measuring means, a misfire pattern judging means for judging if any misfire occurred in a cylinder on the basis of the specific frequency component and judging a misfire pattern if a misfire occurred, a storage means for storing data representing the relation between a misfired cylinder and the phase shift of the specific frequency component for each misfire pattern, and a misfired cylinder judging means for judging a misfired cylinder by comparing the phase shift of the specific frequency component and a phase shift stored in the storage means according to the judged misfire pattern.

Disclosed in Japanese Patent Laid-open No. 6-26996 is a technique for judging a combustion state from the variation of rotating speed. This known technique in order to eliminate the error factor due to the error caused by the measuring system, measures a time necessary for the crankshaft to turn through a predetermined angle, extracts a characteristic component from values of combustion state parameter measured every one or more rotations, calculates a combustion state parameter by using the extracted characteristic component or on the basis of an extracted characteristic component extracted from a value for the necessary time in one or a plurality of rotations, and judges the combustion state of each cylinder on the basis of the combustion state parameter.

Japanese Patent Laid-open No. 4-19344 discusses misfire detection when misfires occur successively (every ignition cycle), but does not discuss the detection of misfires that occur at a low frequency necessary to meet the above-mentioned regulations. Since the two-rotation period component of the output of the rotation signal output means (a component of a frequency equal to a quarter of a frequency fTDC corresponding to the ignition period of a specific cylinder in Japanese Patent Laid-open No. 4-19344, which is equal to two-rotation period component for two rotations of the crankshaft of the engine) or a component of a period equal to a integral multiple of period (a frequency of fTDC/4 m, m is a natural number) is extracted in a fixed period, the extraction frequency varies according to the engine speed. Therefore, the power of a frequency component extracted while the engine speed is momentarily varying disperses on frequency basis and hence the accuracy in misfire detection is reduced. Since a frequency analysis window (sampling frequency) must be longer than the period of a component to be extracted, sampling must be repeated many times. The period of rotation is especially long while the engine speed is low and hence the frequency analysis window must be of a long time. The period of rotation is short while the engine speed is high, the frequency analysis window is, for example, for at least several tens rotations. Therefore, if misfires occur at a low frequency, the frequency component produced by misfires is small and it is difficult to discriminate between misfiring and normal firing. Since specific frequency components must be extracted from many sampled data, load on the arithmetic unit increases and a special, expensive CPU or the like will be necessary.

Japanese Patent Laid-open No. 6-58196 discusses cases where a specific cylinder misfires every ignition cycle, but nothing is taken into consideration about the detection of misfires that occur at a low frequency necessary to meet the above-mentioned regulations. Also, expensive torque measuring means is required. Periodic extraction of rotation ½-order and 1-order components from the output signal of the torque sensor entails the above-mentioned technical problems.

A combustion state detecting technique based on rotating speed information does not need any expensive sensor and is prevalently used for detecting the combustion state of automobile engines. However, it is difficult to detect the combustion state of an engine having a large number of cylinders or a large rotative inertia in a high accuracy because the engine speed varies scarcely when a misfire occurs while the engine is operating at a high engine speed under a low load.

Experiments proved that it is difficult to achieve accurate misfire detection by a prior art proposed by the applicant of the present patent application in Japanese Patent Laid-open No. 6-26996 when an 8-cylinder engine is operating at 6000 rpm under a low load.

It is an object of the present invention to provide a low-cost combustion state diagnosing system and a combustion state diagnosing method capable of accurately detecting misfires which occur at a low frequency while a multiple-cylinder engine is operating at a high engine speed under a low load.

SUMMARY OF THE INVENTION

The object can be achieved, when diagnosing combustion state, by extracting specific rotation period component of a period synchronous with rotation from a combustion state parameter for at least two rotations, and judging combustion state on the basis of the extracted specific rotation period component. The combustion state parameter may be the engine speed or the output torque of a multiple-cylinder engine which varies according to the combustion state of the engine. More concretely, the present invention solves the foregoing problem by the following system.

A combustion state diagnosing system for diagnosing the combustion state of a multiple-cylinder engine by measuring a parameter of combustion state varying according to the combustion state of the engine, such as engine speed or output torque, diagnosing combustion state on the basis of the parameter of the combustion state, comprises: a combustion state parameter measuring means which measures a parameter of the combustion state N times (at least once) in one ignition cycle of the multiple-cylinder engine at times corresponding to a predetermined crank angle; a specific rotation period component extracting means for extracting a specific rotation period component of a period synchronous with rotation of a crankshaft from values of the parameter of the combustion state measured by the combustion state parameter measuring means at least in two rotations of a crankshaft; and a combustion state judging means for judging the combustion state on the basis of the specific rotation period component extracted by the specific rotation period component extracting means.

In the combustion state diagnosing system, the combustion state parameter measuring means may measure necessary times $T(i)$ each necessary for the crankshaft to turn through an angle between predetermined crank angles N times every ignition cycle of the engine, and the specific rotation period component extracting means may be provided with a high-pass filter means which filters out low-frequency components of the necessary times $T(i)$ to calculate filtered necessary times $Tf(i)$ to extract specific rotation period components of a period synchronous with the rotation of the crankshaft from the necessary times $Tf(i)$.

In the combustion state diagnosing system, the high-pass filter means may filter out the components of periods longer than a time necessary for two rotations of the crankshaft of the engine.

In the combustion state diagnosing system, the high-pass filter means may calculate the difference $[T(i)-T(i-N)]$ from the necessary times $T(i)$ corresponding to the cylinders successive in ignition order to use the same as the filtered necessary time $Tf(i)$.

In the combustion state diagnosing system, the measured varying values of torque may be used directly as those of the combustion state parameter.

In the combustion state diagnosing system, the specific rotation period component extracting means may be provided with an arithmetic means which extracts specific rotation period component which is a variable component of $X (=Tf)$ of a period synchronous with the rotation of the crankshaft from the sum of the products of values of the combustion state parameter for at least two rotations of the crankshaft or $Tf (=X)$, i.e., $X(i), X(i-1), \ldots, X(i-c+1)$, where c is not less than the product of N and the number of cylinders of the engine, and at least two sets each of c pieces of weighting coefficients.

In the combustion state diagnosing system, the weighting coefficients may be set so as to extract a two-rotation period components of a period synchronous with two rotations of the crankshaft of the engine.

In the combustion state diagnosing system, the specific rotation period component extracting means may extract components synchronous with two rotations of the crankshaft of the engine. A one-rotation period component may be used.

In the combustion state diagnosing system, the specific rotation period component extracting means may extract components synchronous with one rotation of the crankshaft of the engine.

In the combustion state diagnosing system, the combustion state judging means may count the frequency of successive values of the specific rotation period component exceeding a predetermined value, may judge that a misfire occurred every ignition cycle if the count of the frequency is greater than a predetermined number, and may judge that a misfire occurred at intervals if the count of the frequency is not greater than the predetermined value.

In the combustion state diagnosing system, the specific rotation period component extracting means may include a phase calculating means for calculating the phase of the specific rotation period component, and the combustion state judging means may include a misfiring cylinder identifying means for finding the number of misfiring cylinders and/or misfiring cylinders on the basis of at least the phase of the specific rotation period component.

In the combustion state diagnosing system, the combustion state judging means may specify a pattern indicating a maximum from the sum of the products of a plurality of values of the combustion state parameters or $Tf (=X)$, i.e., $X(i), X(i-1), \ldots, X(i-d+1)$, where d is a constant, and d pieces of weighting coefficients for a plurality of predetermined patterns when it is judged that a misfire occurred, and may identify a misfiring cylinder on the basis of the maximum and the specified pattern.

Preferably, the combustion state diagnosing system further comprises a misfire counting means for counting the frequency of judgements that a misfire occurred made by the combustion state judging means in a predetermined period, and an alarm means for giving an alarm to the driver when the frequency exceeds a predetermined number and/or a misfire information storage means for storing misfire information.

The present invention provides an engine combustion state diagnosing program storage medium storing a program for measuring a combustion state parameter varying according to the combustion state of a multiple-cylinder engine, such as engine speed at which the multiple-cylinder engine is operating or output torque of the multiple-cylinder engine and judging the combustion state on the basis of the combustion state parameter; in which the program specifies measuring the combustion state parameter N times (at least once) in one ignition cycle of each cylinder at a predetermined crank angle, extracting a specific rotation period component of a period synchronous with rotation from at least the two values of the combustion state parameter, and judging the combustion state on the basis of the extracted specific rotation period component.

BRIEF DESCRIPTION OF THE DRAWINGS

FIG. 8 is table of misfiring patterns.

REFERENCE CHARACTERS

DESCRIPTION OF THE PREFERRED EMBODIMENTS

Preferred embodiments of the present invention will be described hereinafter with reference to the accompanying drawings.

Figure 1:
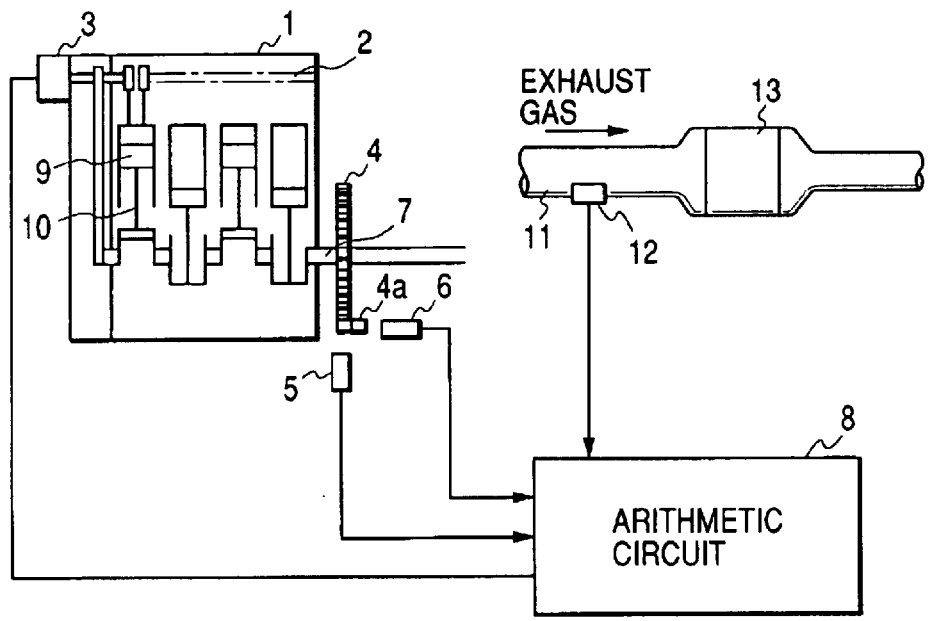
FIG. 1 is a block diagram of a combustion state diagnosing system in a preferred embodiment according to the present invention.

FIG. 1 is a block diagram of a combustion state diagnosing system in a preferred embodiment according to the present invention for diagnosing the combustion state of an engine. An engine 1 is provided with a position sensor 5 for measuring crank angle, a phase sensor 3 for finding a reference position. In this embodiment, the position sensor 5 detects electromagnetically the teeth of a ring gear 4 included in an engine starting mechanism for starting the engine 1, and provides a number of signals equal to that of the teeth of the ring gear 4 every rotation of a crankshaft 7. A reference sensor 6 detects electromagnetically a projection 4a formed on the ring gear 4 to provide a signal indicating a specific crank angle once every one rotation of the crankshaft 7. The phase sensor 3 which generates a signal for identifying cylinders once every two rotations of the crankshaft 7 is combined with a cam shaft 2. The present invention may be provided with sensors other than those sensors. Detection signals provided by the sensors 3, 5 and 6 are given to an arithmetic circuit 8, and the arithmetic circuit 8 calculates a crank angle, an engine speed and such. In FIG. 1, indicated at 9 are pistons, at 10 are connecting rods connecting the pistons 9 to the crankshaft 7.

The oxygen concentration of the exhaust gas flowing through an exhaust pipe 11 is measured by an oxygen concentration sensor 12, and the exhaust gas is purified by a catalytic unit 13. If a misfire occurs, unburned gases are discharged from the engine 1 into the exhaust pipe 11 and burn in the catalytic unit 13. Consequently, the catalytic unit 13 is heated at an abnormally high temperature, the catalyst of the catalytic unit 13 is deteriorated, and the unburned gases are discharged into the atmosphere to cause air pollution. In the nature of things various injurious gases cannot be removed from the exhaust gas and cause air pollution if the catalyst of the catalytic unit 13 is deteriorated even if misfires do not occur.

Figure 2:
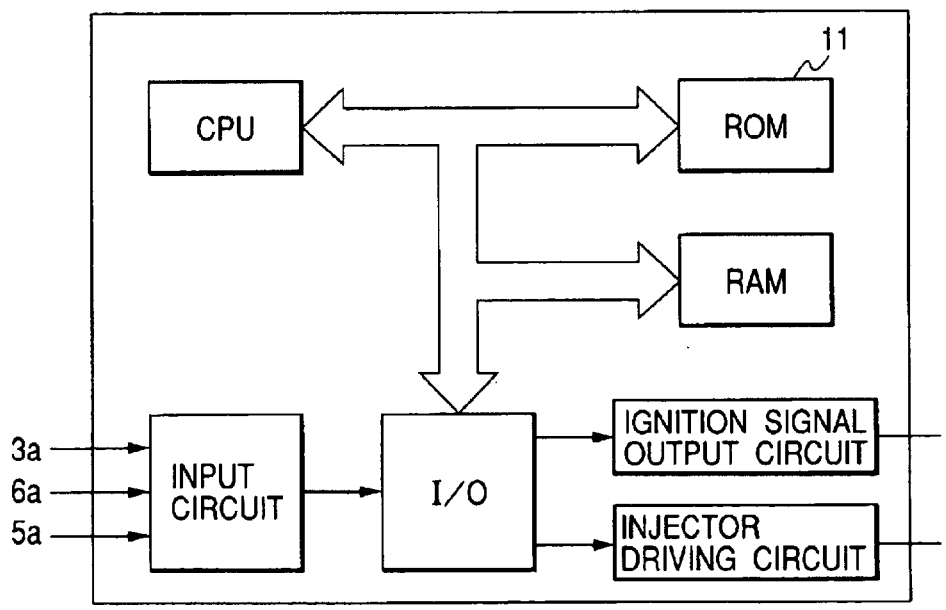
FIG. 2 is a block diagram of an arithmetic circuit.

FIG. 2 is a block diagram of an arithmetic circuit 8 shown in FIG. 1. An output signal 3a of the phase sensor 3, an output signal 5a of the position sensor 5, an output signal 6a of the reference sensor 6, and respective output signals of an air flow sensor, not shown, and a water temperature sensor, not shown, are given to the arithmetic circuit 8. Ignition, fuel supply and such are controlled according to a control program stored in a ROM 11 on the basis of those output signals of the sensors.

Figure 3:
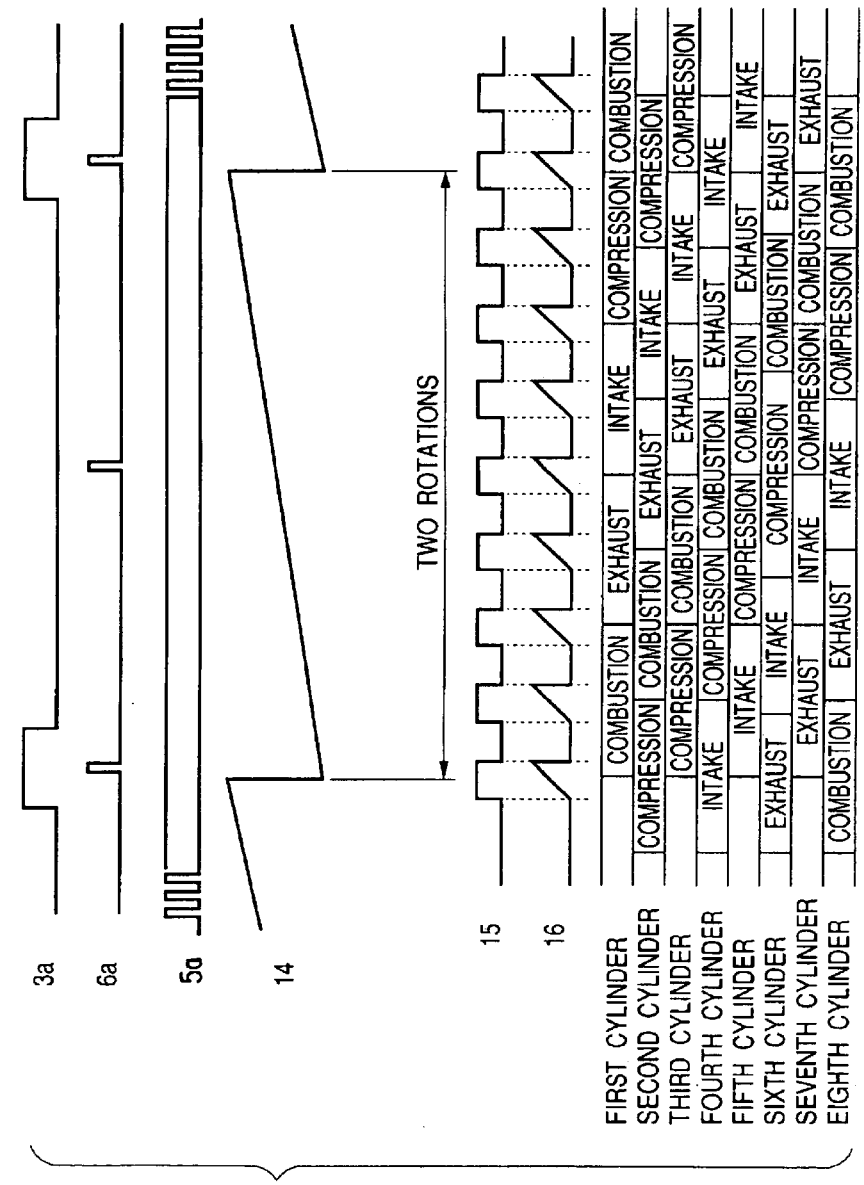
FIG. 3 is a timing diagram showing signals.

FIG. 3 is a timing diagram of signals for an eight cylinder engine. FIG. 3 shows the waveform of the output signal 3a of the phase sensor 3 shaped by a waveform shaping circuit, not shown, and the output signal 3a has one pulse every two rotations of the crankshaft 7. The output signal 3a has a pulse provided at time corresponding to, for example, time when the piston of the first cylinder is at the combustion top dead center. FIG. 3 shows the waveform of the output signal 6a of the reference sensor 6 shaped by a waveform shaping circuit, not shown. The output signal 6a has one pulse every one rotation of the crankshaft 7 and the pulse is provided at time corresponding to, for example, when the piston of first cylinder is at the top dead center. FIG. 3 shows the waveform of the output signal 5a of the position sensor 5 shaped by a waveform shaping circuit, not shown. The output signal 5a has pulses provided at times corresponding to fixed crank angles corresponding to the teeth of the ring gear 4.

A curve 14 indicates the variation of the count of the pulses of the signal 5a with time. The count indicated by the curve 14 is reset when the AND signal between the signals 3a and 6a is true. A crank angle with reference to, for example, the combustion top dead center of the piston of the first cylinder can be known from the count indicated by the curve 14. A curve 15 represents a signal indicating engine speed measuring sections, and, on the basis of the counted value 14, has pulses each corresponding to an angular range around a crank angle corresponding to the combustion top dead center of the piston of each cylinder. In this example, the ignition order is the first, the second, the third, . . . and the eighth cylinder. Engine speed measuring sections corresponding to the cylinders are designated by the numbers of the cylinders. Time T necessary for the crankshaft 7 to rotate through the engine speed measuring section is measured by a timer. A curve 16 represents the operation of the timer. The time T is stored temporarily in a RAM or the like before the same is applied to a processing routine. Although dependent on the variation of the engine speed when a misfire occurs, the resolution of the time is 1 $\mu$s at most, preferably, in the range of 0.05 to 0.2 $\mu$s. The time T may be measured by any other suitable method provided that a time necessary for the crankshaft 7 to turn through a predetermined angle can be measured.

Figure 4:
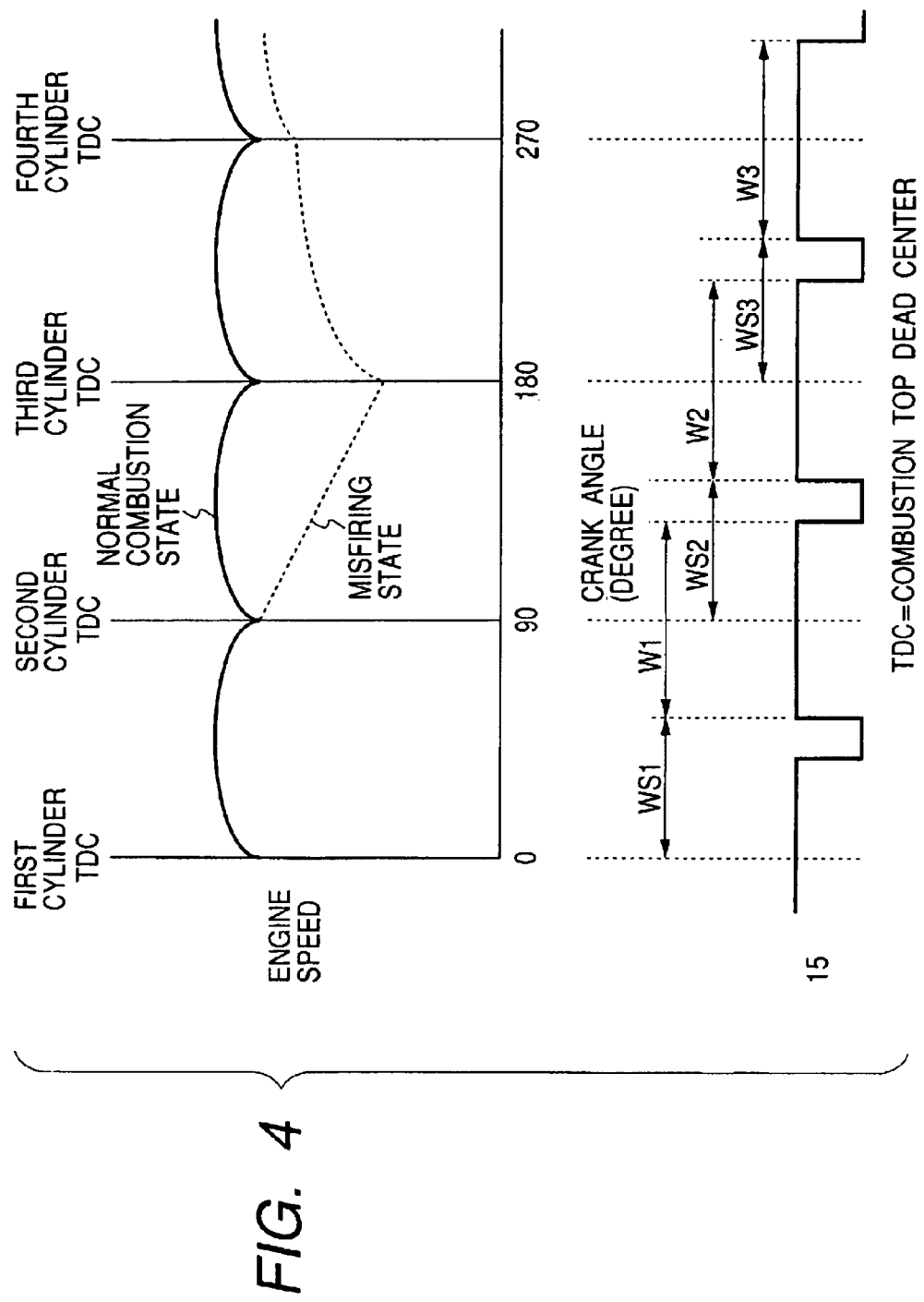
FIG. 4 is a diagrammatic view of assistance in explaining an engine speed measuring section.

FIG. 4 is a diagram of assistance in explaining the engine speed measuring section. Suppose that a misfire occurred in the second cylinder, a drop in the engine speed increases to a maximum at time when the piston of the third cylinder is near the combustion top dead center. Each of the engine speed measuring sections (the curve 15) corresponds to, for example, an angular range Wn from a crank angle Wsn with respect to the combustion top dead center of the piston of each cylinder, where n=1, 2, . . . or 8. To facilitate calculation, it is desirable that all the angular ranges Wn (n=1, 2, 3, . . . and 8) are equal. It is preferable that WS1=WS5, W1=W5, . . . , and WS4=WS8 and W4=W8 to eliminate the influence of pitch errors in the ring gear 4. Thus the same engine speed measuring sections are used every rotation of the crankshaft 7. It is preferable that all the angular ranges Wn are a fixed value; otherwise the following normalizing process must be carried out before a filtering process using a high-pass filter.

$$T'=T\times W/Wn$$

where T' corresponds to a necessary time for turning through the engine speed measuring section of the width W.

Although one engine speed measuring section is determined for each cylinder, two engine speed measuring sections may be determined for each cylinder. Although operations necessary for the arithmetic process increases if the number of engine speed measuring sections increases, the influence of pitch errors in the ring gear 4 is reduced and accuracy in misfire detection is improved. The position and the width of the engine speed measuring section are not limited to those employed in this embodiment.

Figure 5:
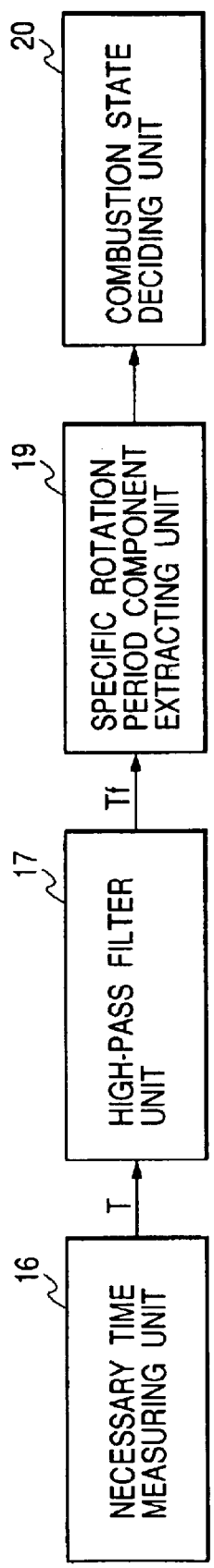
FIG. 5 is a block diagram of assistance in explaining the functions of a preferred embodiment according to the present invention.

FIG. 5 is a block diagram showing the functions of the embodiment. A necessary time measuring unit 16 measures the necessary time T necessary for the crankshaft to turn through a predetermined angle for each cylinder. A high-pass filter unit 17 filters out low-frequency components of the necessary time T to calculate a filtered necessary time Tf. A specific rotation period component extracting unit 19 extracts a specific rotation period component of a period synchronous with rotation of the crankshaft from the filtered necessary times Tf for two rotations. A combustion state judging unit 20 judges a combustion state on the basis of the specific rotation period component extracted by the specific rotation period component extracting unit 19.

Figure 6:
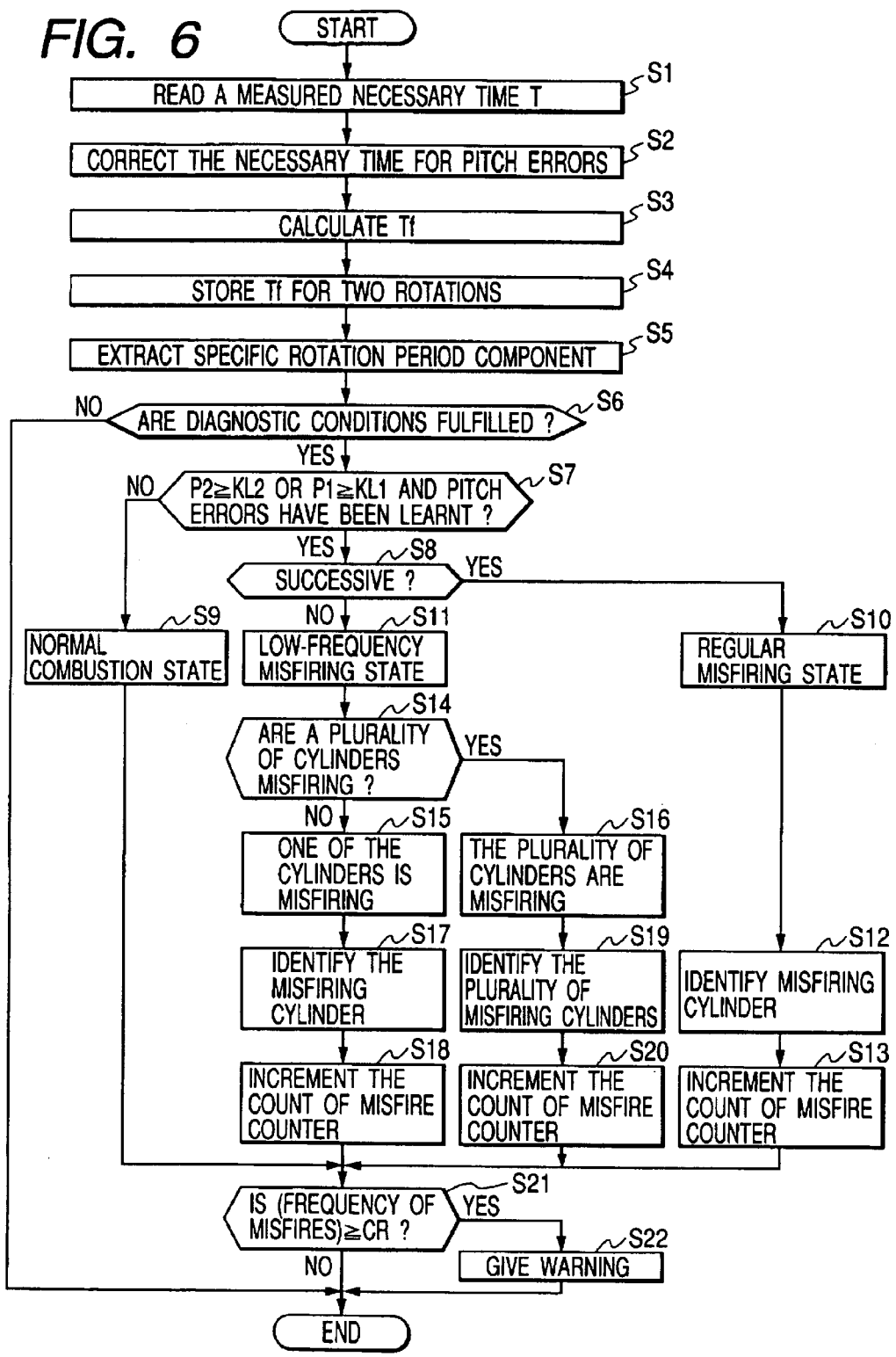
FIG. 6 is a flow chart of a procedure in a preferred embodiment according to the present invention.

FIG. 6 is a flow chart of a procedure to be carried out by the embodiment of the present invention. This procedure uses a recording medium storing a program specifying operations for measuring the value of a combustion parameter which varies according to the combustion state of the engine, and judging a combustion state on the basis of the combustion parameter. For example, the procedure shown in FIG. 6 is started every time the necessary time is measured. It is to be noted that the following processes are executed in synchronism with ignition cycles. Thus a specific rotation period component synchronous with the rotation can be easily extracted.

In step S1, a measured necessary time T is read. This step is executed every time a necessary time T is measured. Therefore, if N necessary time measuring sections are set for each cylinder, the step is executed for each necessary time measuring section.

Then step S2 is executed. Basically, above processes may be executed once every ignition cycle.

The accuracy of misfire detection is affected by pitch errors in the ring gear 4 if one-rotation period component is used. The necessary time T is subjected to pitch error correction in step S2. As mentioned in, for example, Japanese Patent Laid-open No. 5-332189, pitch error correction is achieved by measuring the necessary time T during operation under a specific operating condition, such as during fuel cut control, errors in the width of each desired time measuring section are determined to learn a correction coefficient. The necessary time T is multiplied by the correction coefficient for the necessary time measuring section corresponding to the necessary time T to correct errors attributable to the pitch errors.

In step S3, low-frequency components of the necessary time T are filtered out to calculate a filtered necessary time Tf. The filtered necessary time Tf is calculated by using the following expressions.

$$Tf(n)=T(n)-T(n-1) \quad (1)$$

$$Tf(n)=T(n)-T(n-1)/Tn^3 \quad (2)$$

where n is the number of the cylinder.

Expression (1) expresses the function of a most simple differentiation filter for removing low-frequency components. The variation of the filtered necessary time Tf calculated by using Expression (1) due to a misfire is greatly dependent on the engine speed and hence it is preferable to use Expression (2). If the filtered necessary time Tf is calculated by using Expression (2), the variation of the filtered necessary time Tf due to a misfire is not dependent on the engine speed (inversely proportional to T) and is substantially proportional to load on the engine (output torque).

It is essential to remove low-frequency components of periods not smaller than an analysis window (the number of sampling operations) for extracting specific rotation period components. For example, the moderate variation of the engine speed during acceleration or deceleration causes errors when extracting specific rotation period components and, therefore, such low-frequency components must be removed. Therefore, the low-frequency components may be removed by means other than the foregoing high-pass filter.

The analysis window can be narrowed without increasing errors if such low-frequency components are removed, and hence misfires that occur at a low frequency can be detected.

The filtered necessary times Tf for two rotations, i.e., for eight ignition cycles, are stored in step S4.

Specific rotation period components are extracted from the filtered necessary times Tf in step S5.

Figure 7:
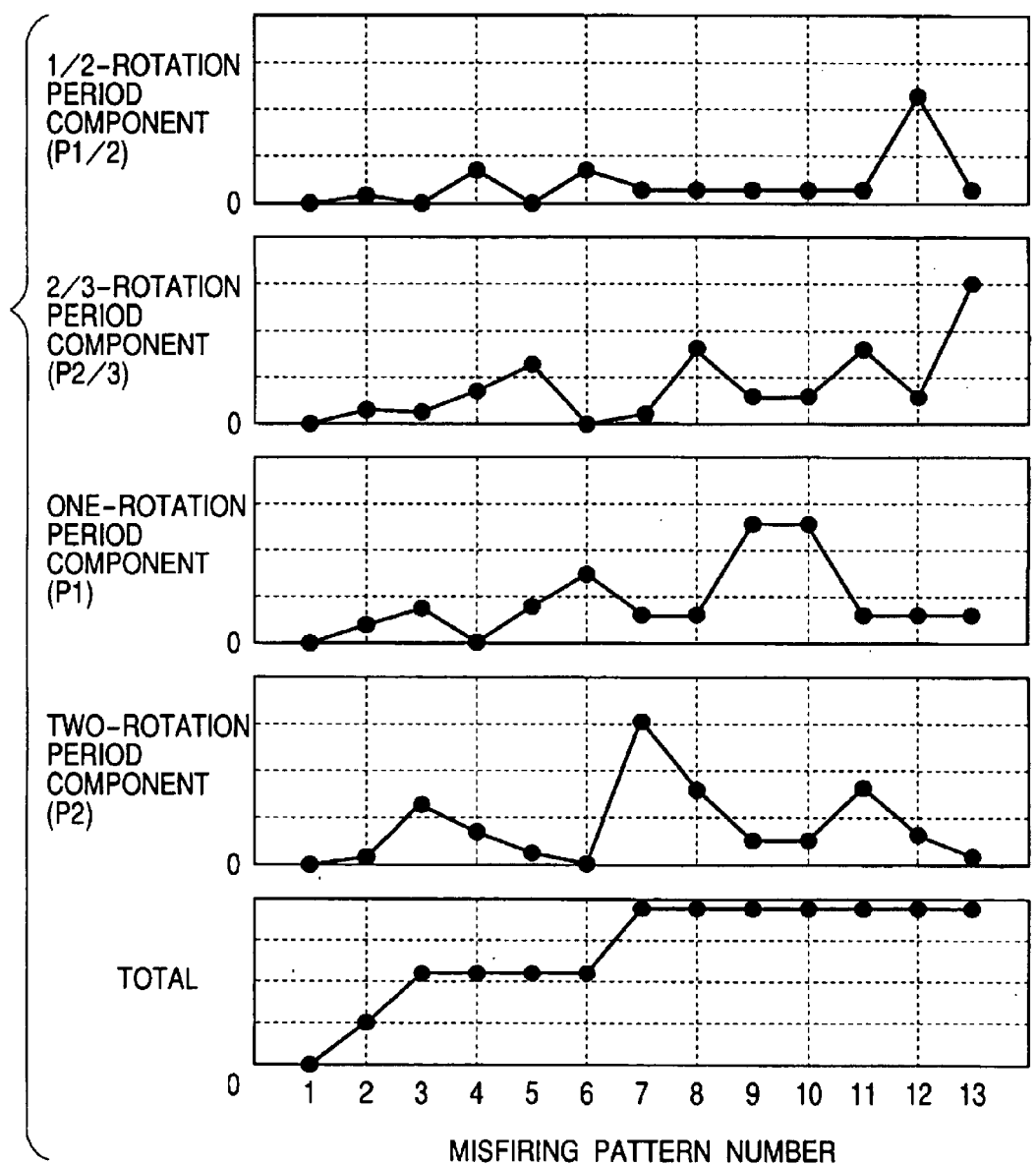
FIG. 7 is a graph showing the magnitudes of various rotation period components.

Kinds of specific rotation period components to be extracted will be explained. FIG. 7 shows the magnitudes of rotation period components when a misfire occurred repeatedly in each of various misfiring patterns. Misfiring patterns designated by misfiring pattern numbers are shown in FIG. 8. All the components are zero in the not misfiring state as pattern No. 1. If misfires occur, the magnitudes of the rotation period components correspond to a value corresponding to the number of the cylinders in which misfires occurred. The misfiring pattern No. 2 is for the specific rotation period components when a misfire occurred in one cylinder, the misfiring patterns Nos. 3 to 6 are for the specific rotation period components when misfires occurred in two cylinders, and misfiring patterns Nos. 7 to 13 are for the specific rotation period components when misfires occurred in three cylinders. The distribution of the components is dependent on misfiring pattern. Basically, this embodiment extracts two-rotation period components, and one-rotation period components as auxiliary components for the following reasons. One of the reasons for extracting two-rotation period components and one-rotation period components is that extraction is hardly subject to the influence of measuring errors in the necessary time T due to the width of the necessary time measuring section. The width of the necessary time measuring section is affected directly by pitch errors in the ring gear 4. As mentioned above, errors in T and Tf attributable to pitch errors in the ring gear 4 include only components of periods shorter than the one rotation period if the same engine speed measuring section is used every rotation; that is, the two-rotation period components are not affected by pitch errors in the ring gear 4. Variation of the engine speed due to differences in mass between operating members, such as the pistons of the engine includes only components of periods shorter than that of the one-rotation period components. Thus, the two-rotation period components are hardly subject to the influence of various errors. Although the one-rotation period components are subject to the influence of the errors, the same are less susceptible to the errors than the ⅔-rotation period components and ½-rotation period components. As shown in FIG. 7, it is difficult to discriminate the misfiring patterns Nos. 6 to 13 in which misfires occur every rotation from a normal pattern by the two-rotation period components. Therefore one-rotation period components different from normal components in such misfiring patterns are selected.

The specific rotation period components for the 8-cylinder engine are calculated by using the following expressions.

$$Pxr(n) = \sum_{k=0}^{7} Tf(n-k) \times Wxr(k) \quad (3)$$

$$Pxi(n) = \sum_{k=0}^{7} Tf(n-k) \times Wxi(k)$$

$$Px(n) = Pxr(n)^2 + Pxi(n)^2$$

Pxr and Pxi are the real parts and the imaginary parts of the x-rotation period components, and Px is the sum of squares of the real parts and the imaginary parts signifying the power of the x-rotation period components.

Figure 9:
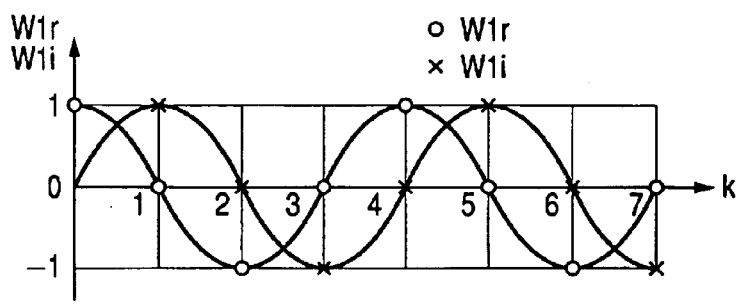
FIG. 9 is a diagrammatic view of assistance in explaining weighting coefficients.
Figure 10:
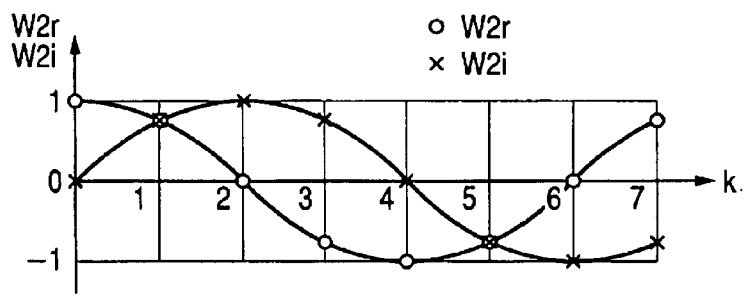
FIG. 10 is a diagrammatic view of assistance in explaining weighting coefficients.

Wxr and Wxi are weighting coefficients for extracting the real parts and the imaginary parts of the x-rotation period components. FIGS. 9 and 10 show weighting coefficients for extracting one-rotation period components and two-rotation components, respectively. These weighting coefficients are determined on the basis of the position of the necessary time measuring section. The extraction of the specific rotation period components is achieved by using Expression (3) and two rotations (eight data) as an analysis window, and by shifting the window by one step corresponding to one data every ignition cycle.

If N necessary time measuring sections are set for all the cylinders, weighting coefficients respectively for those necessary time measuring sections are necessary. If N=2, the following expression is used for calculating specific rotation period components.

$$Pxr(n) = \sum_{k=0}^{15} Tf(n-k) \times Wxr(k) \quad (4)$$

$$Pxi(n) = \sum_{k=0}^{15} Tf(n-k) \times Wxi(k)$$

$$Px(n) = Pxr(n)^2 + Pxr(n)^2$$

Figure 11:
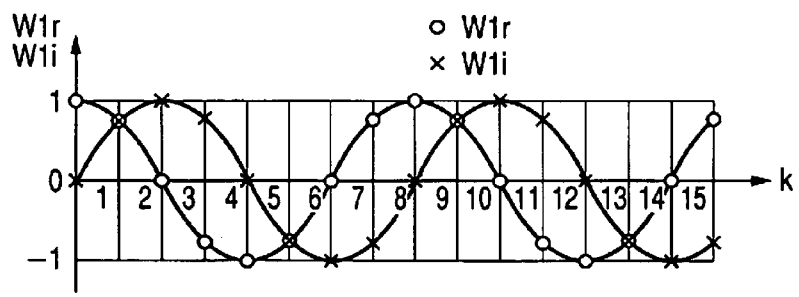
FIG. 11 is a diagrammatic view of assistance in explaining weighting coefficients.
Figure 12:
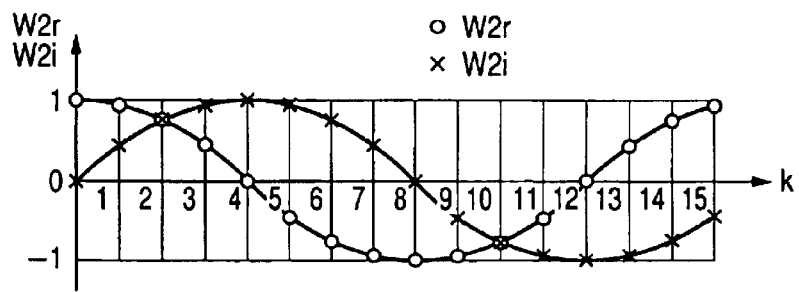
FIG. 12 is a diagrammatic view of assistance in explaining weighting coefficients.

FIGS. 11 and 12 show weighting coefficients for extracting one-rotation period components and two-rotation period components, respectively. The weighting coefficients are determined on the basis of the position of the necessary time measuring section. The weighting coefficients shown in FIGS. 11 and 12 applied to a case where the necessary time measuring sections are arranged at equal intervals.

The specific rotation period component extracting unit 19 is provided with an arithmetic device which extracts the specific rotation period components, i.e., variable components of Tf, i.e., X, of a period synchronous with rotation from the sum of the products of the combustion parameter for two rotations or Tf (X), i.e., X(i), X(i-1), . . . and X(i-c+1), where c is greater than or equal to the product of N and at least two predetermined sets each of C pieces of weighting coefficient. For example, the weighting coefficients are determined so as to extract one-rotation period components of a period synchronous with one rotation and two-rotation period components of a period synchronous with two rotations of the crankshaft.

The number of Tf corresponding to two rotations (8×N for 8-cylinder engine) is used for extracting the specific rotation period components of Tf because the number is the least necessary number for extracting two-rotation period components. Although the number of Tf may be greater than that corresponding to two rotations, frequent misfiring and each-ignition-cycle misfiring differ from each other in the magnitude of the specific rotation period components and different thresholds may be necessary. Since any decision need not be made by using two rotations as a unit to cancel out the pitch errors, load on calculation will be doubled, tripled, ... if two rotations, four rotations, six rotations, ... are used. Accordingly, it is most preferable that the number of Tf for extracting the specific rotation period components of Tf corresponds to two rotations.

Figure 13:
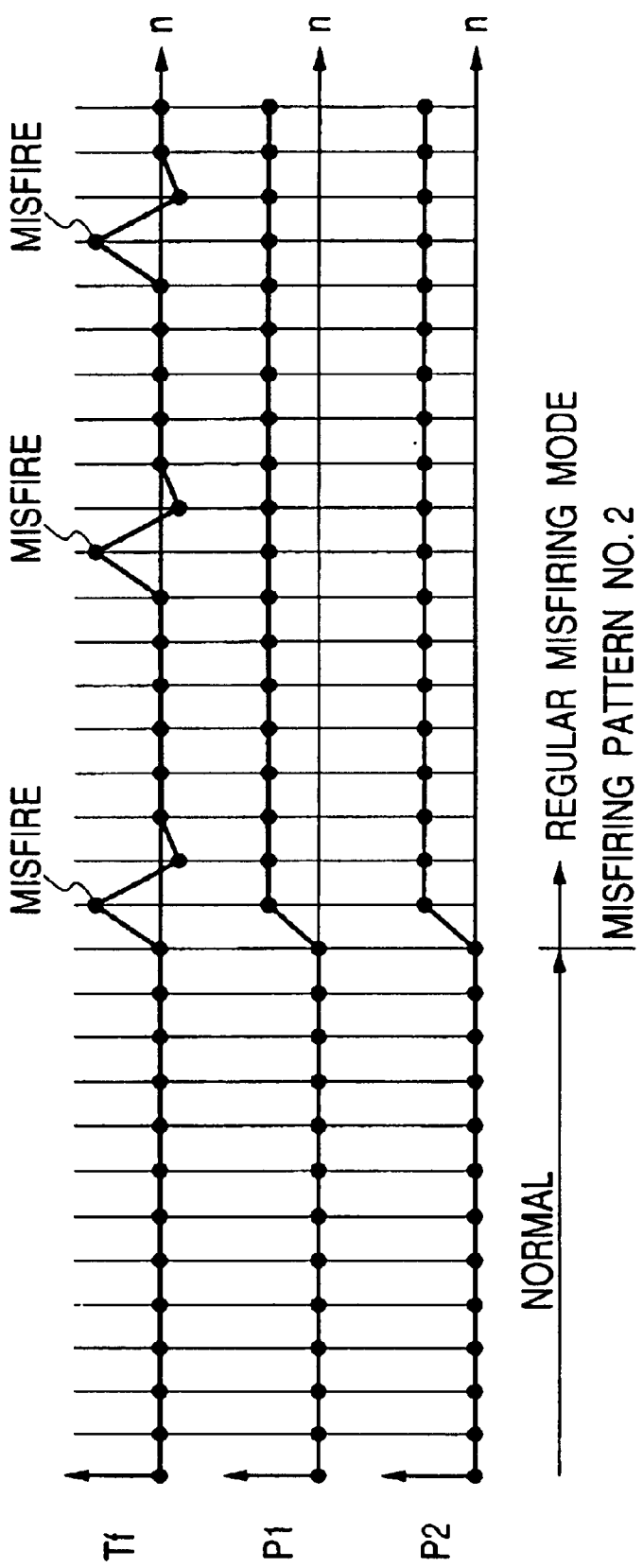
FIG. 13 is a diagrammatic view of assistance in explaining the behavior of specific rotation period components when a misfire occurred.
Figure 14:
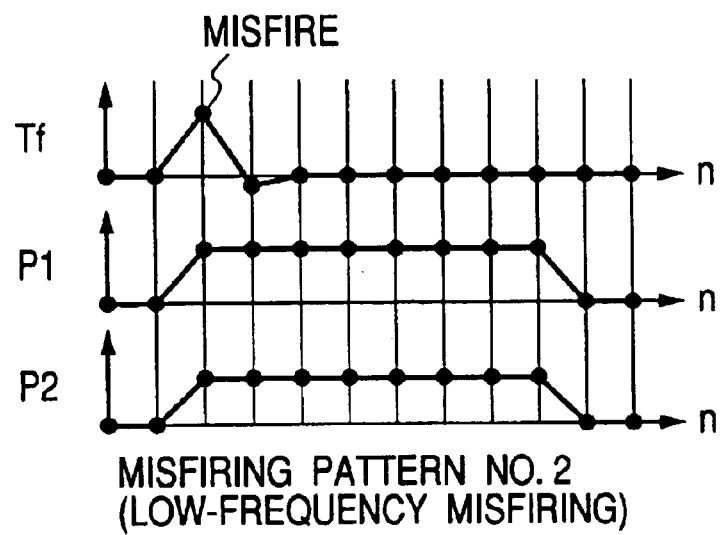
FIG. 14 is a diagrammatic view of assistance in explaining the behavior of specific rotation period components when a misfire occurred.
Figure 15:
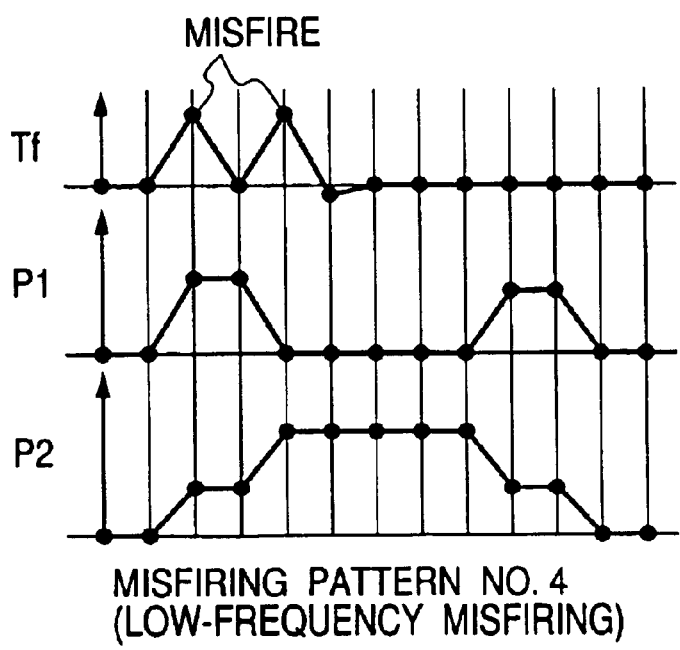
FIG. 15 is a diagrammatic view of assistance in explaining the behavior of specific rotation period components when a misfire occurred.
Figure 16:
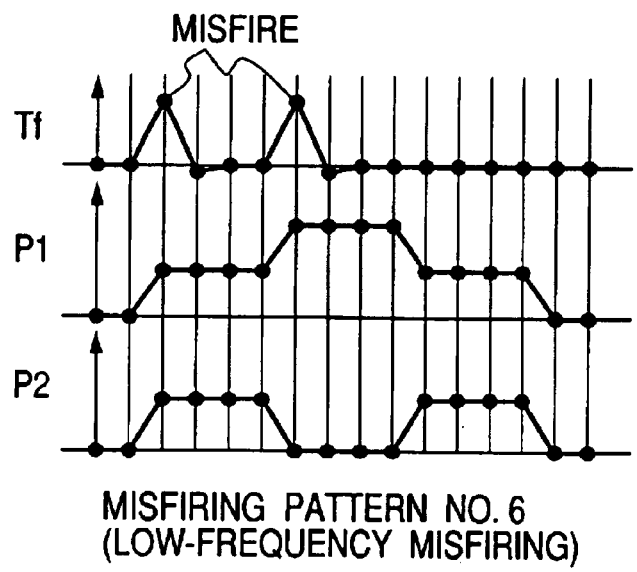
FIG. 16 is a diagrammatic view of assistance in explaining the behavior of specific rotation period components when a misfire occurred.

FIGS. 13 and 14 show Tf in cases where one of the cylinders is misfiring (the misfiring pattern No. 2) every ignition cycle and at a low frequency, and the modes of behavior of power P1 for one rotation period components and power P2 for tow rotation period components. If a misfire occurs every ignition cycle, P1 and P2 remain substantially constant regardless of misfiring pattern. If misfires occur at a low frequency, P1 and P2 increase temporarily and returns to the former levels for normal combustion pattern after eight combustion cycles. If misfires occur at a low frequency, the behavior of P1 and P2 assume greatly different modes for different misfiring patterns. FIGS. 15 and 16 show Tf and the modes of behavior of P1 and P2 for the misfiring patterns Nos. 4 and 6, respectively. It is to be noted that there is little difference between P2 for the normal combustion pattern and P2 for the misfiring pattern No. 6 when the engine misfires in a regular misfiring mode in which a misfire occurs every ignition cycle, and there is a significant difference between P2 for the normal combustion pattern and P2 for the misfiring pattern No. 6 when the engine misfires in a low-frequency misfiring mode in which misfires occur at a low frequency.

In step S6, a query is made to see if diagnostic conditions necessary for the proper diagnosis of combustion state are fulfilled. If the response in step S6 is affirmative, step S7 is executed. If the response in step S6 is negative, the procedure is ended without judging any combustion state. The diagnostic conditions include the sensors including the reference sensor 6 being functional, the fuel cut control is not in operation, and the engine speed is in a predetermined engine speed range and neither excessively high nor excessively low. A transient state where the operation of the engine changes sharply, such as a state in which the engine is sharply accelerated or decelerate or the transmission is shifted, or the vehicle is traveling on a rough road, the engine speed varies and it is possible that the engine is misfiring even if the engine is in the normal combustion state. Therefore, it is preferable to exclude such a state from the diagnostic conditions.

In step S7, the combustion state is judged on the basis of the specific rotation period components.

Condition (A) that the two-rotation period component P2 is not smaller than a predetermined threshold KL2 and, if the learning of the pitch errors in the ring gear has been completed, a condition (B) that the one-rotation period component P1 is not smaller than a predetermined threshold KL1 are examined. If either the condition (A) or (B) is fulfilled, it is judged that the engine is misfiring and then step S8 is executed. If neither the condition (A) nor (B) is fulfilled, it is judged that the engine is not misfiring and it is judged that the engine is operating in the normal combustion state in step S9. If either the condition (A) or (B) is fulfilled in the preceding diagnosing cycle and neither the condition (A) nor (B) is fulfilled in the succeeding diagnosing cycle, step S8 is executed.

In step S8, the number of successive diagnosing cycles in which either the condition (A) or (B) is fulfilled is examined. If the number is greater than a predetermined number, for example sixteen, it is judged that the engine is misfiring every ignition cycle and step S10 is executed. If a state in which the number of successive diagnosing cycles in which either the condition (A) or (B) is fulfilled is below the predetermined number is followed by a state in which neither the condition (A) nor (B) is fulfilled, it is judged that misfires are occurring at a low frequency and step S11 is executed. The procedure advances from step S10 to step S12 to identify cylinders misfiring every ignition cycle, and then the respective counts of a misfire counter for the relevant cylinder and a total misfire counter are incremented.

Figure 17:
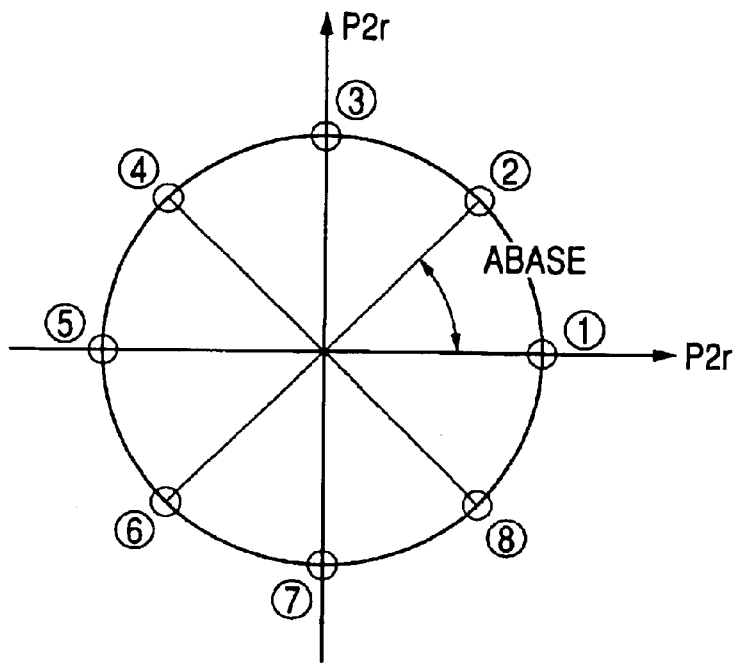
FIG. 17 is a diagrammatic view of assistance in explaining the behavior of two-rotation period component when a misfire occurred.
Figure 18:
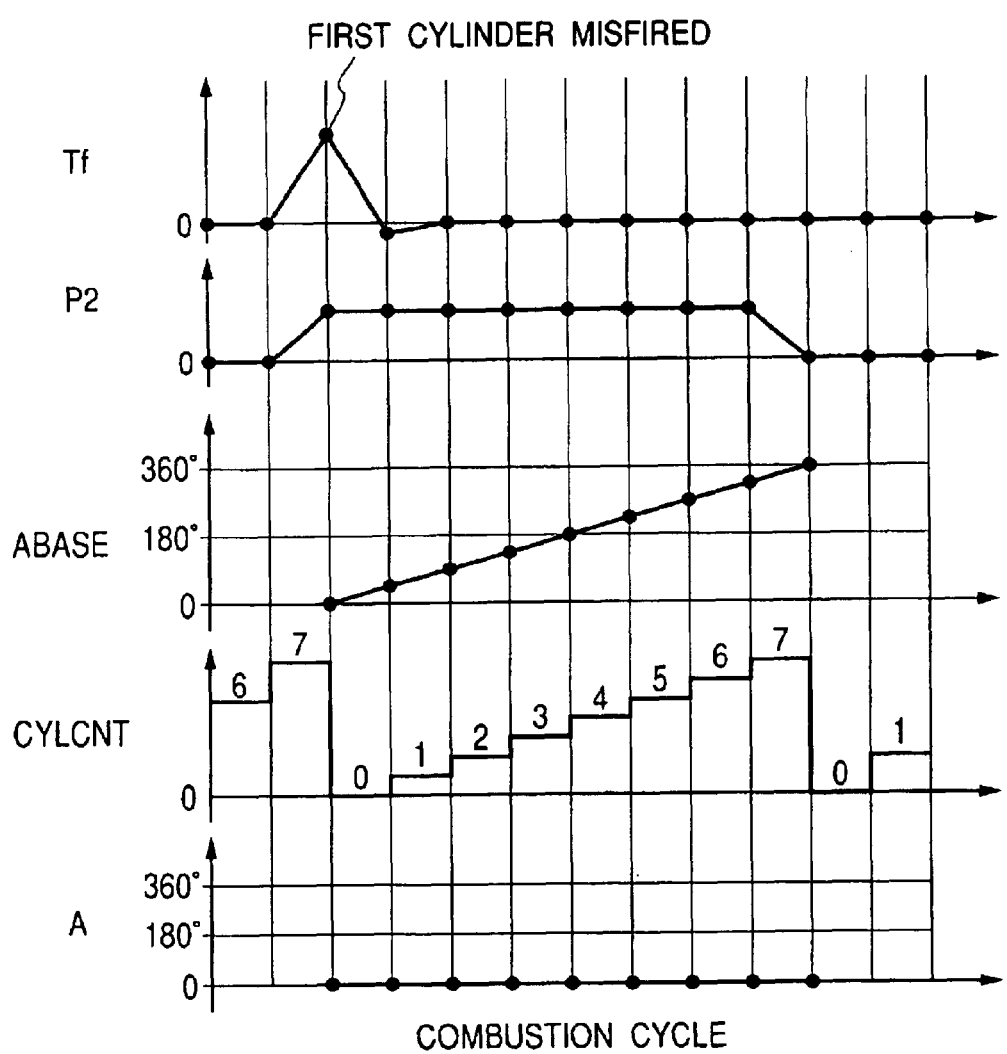
FIG. 18 is a diagrammatic view of assistance in explaining the behavior of specific rotation period components and such.
Figure 19:
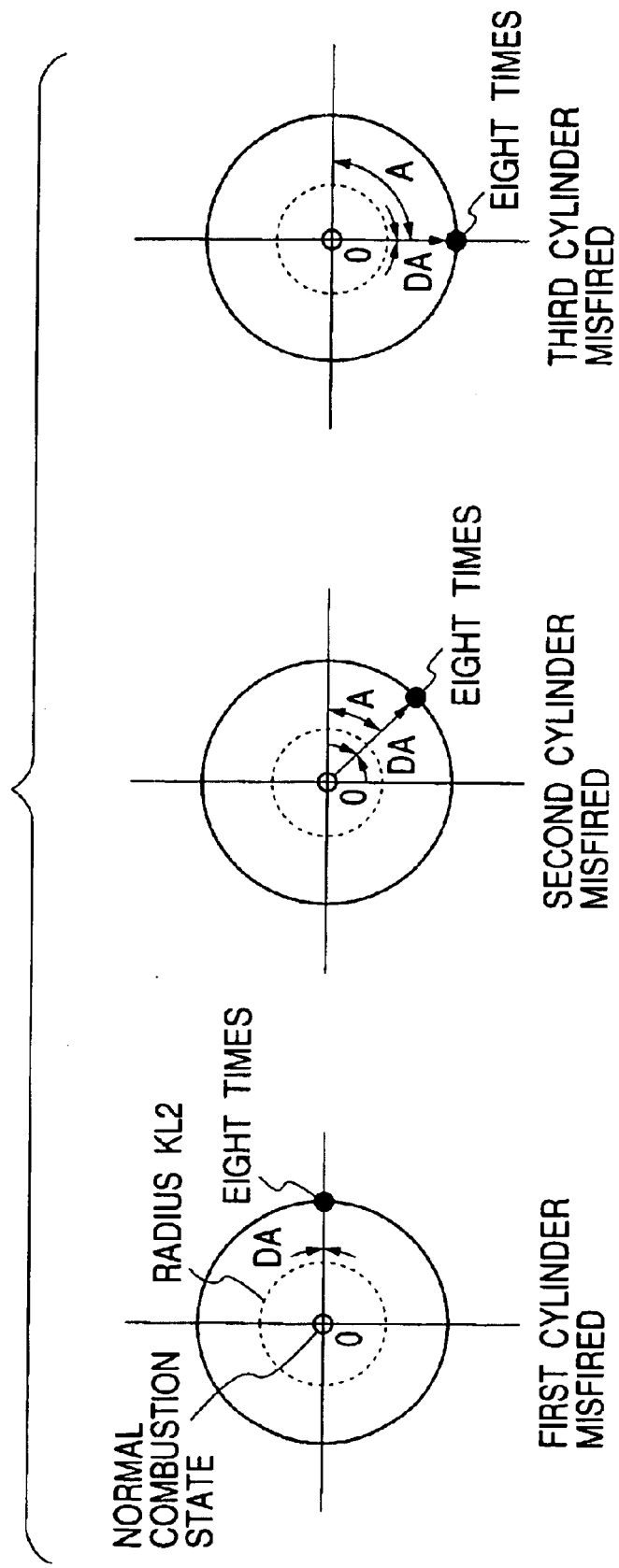
FIG. 19 is a diagrammatic view of assistance in explaining the behavior of two-rotation period component when a misfire occurred.
Figure 20:
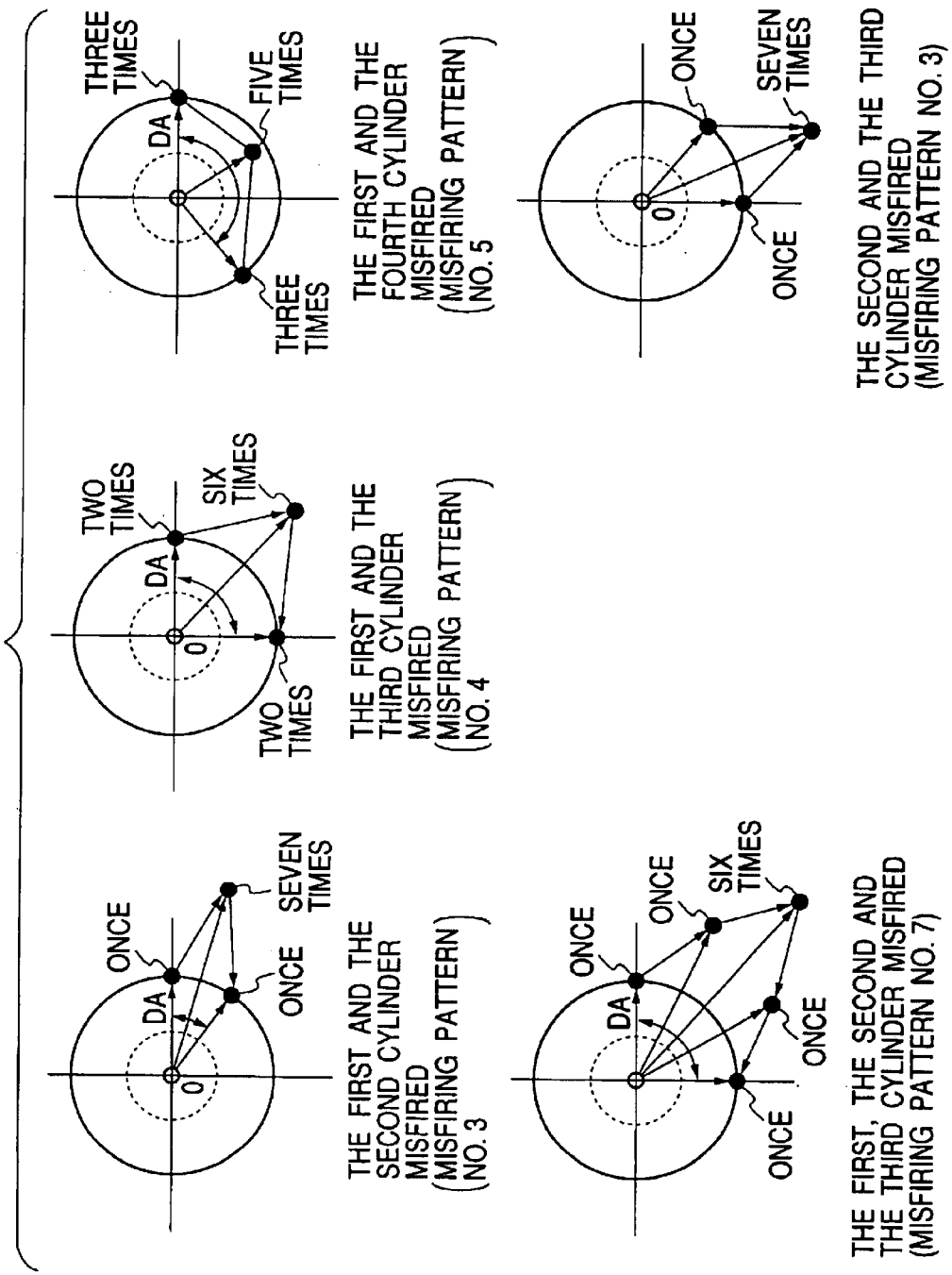
FIG. 20 is a diagrammatic view of assistance in explaining the behavior of two-rotation period component when a misfire occurred.

In step S14, a query is made to see if the plurality of cylinders misfired. A method of determining whether or not the plurality of cylinders misfired will be described by way of example. FIG. 17 shows the behavior of P2$r$ and P2$i$ when a specific cylinder misfired only once. A point moves along a path substantially resembling a circle of a fixed radius in steps of 45° starting from a position (1) through positions (2), (3), ... and (8). An angle between an axis P2$r$ and a vector (P2$r$, P2$i$) is $A_{base}$. The behavior of the one-rotation period component P1 is different and a point revolves two times in steps of about 90°. FIG. 18 shows the same case as that shown in FIG. 17. In FIG. 18, ignition cycles are plotted on the horizontal axis. If a counter CYLCNT which counts 0 to 7 for the first to the eighth cylinder every ignition cycle is used, and:

$$A = A_{base} - CYLCNT \times 45 \quad (5)$$

the value of A is substantially constant. In the normal combustion state, P2 is approximately 0, the calculation of A and $A_{base}$ is insignificant and hence A and $A_{base}$ are not calculated. FIG. 19 shows the behavior of and A when each of the first, the second and the third cylinder misfires once on a polar coordinate system. A point lies near the origin in the normal combustion state. Point appears eight times at an angular position dependent on the number of the cylinder outside the threshold KL2, and returns to the origin when a misfire occurs. Suppose that the difference between the maximum and the minimum of A is DA when the value increases beyond the threshold KL2 due to a misfire. Then, the difference DA is substantially 0 in this case. FIG. 20 shows some examples of the behavior of P2 and A on a polar coordinate system when each of the plurality of cylinders misfires once. For example, if the first and the second cylinder misfire, a point appears once at a position for first cylinder misfiring shown in FIG. 19, seven times at a position for the vector sum of first cylinder misfiring and second cylinder misfiring (more precisely, a position substantially corresponding to the vector sum when the behavior of √P2 and A is shown on a polar coordinate system), and a point appears once at a position for second cylinder misfire shown in FIG. 19. This behavior is greatly dependent on the pattern of misfiring. In this case, the difference DA is defined as mentioned above. When the plurality cylinders misfire, the difference DA is far greater than 45°. Accordingly, the procedure advances to step S16 if DA is not smaller than, for example, 25° and it is judged that the plurality of cylinders misfired, or the procedure advances to step S15 and it is judged that one of the cylinders misfired.

Then, the procedure advances from step S15 to step S17 to identify the misfired cylinder. For example, since the different misfired cylinders have different values of A as shown in FIG. 19, the mean of the values of A is calculated, and it is judged that the first cylinder misfired if the mean is in the range of 0°±22.5°, the second cylinder misfired if the mean is in the range of −45°±22.5°, . . . . After judging the misfired cylinder, the respective counts of a misfire counter for the relevant cylinder and the total misfire counter are incremented.

The procedure advances from step S16 to step S19 to identify the misfired cylinder. For example, the first and the last misfired cylinder can be identified by the values of A as sown in FIG. 20. Although it is impossible to identify the misfired cylinders, the number of the misfired cylinders (the frequency of misfires) can be found from the frequency of changes of the point A (twice if the two cylinders misfired and three times if the three cylinders misfired). If the number of times of existence of point at the position every change of A is used, the intermediate misfired cylinders can be identified. For example, if the first and the third cylinder misfire, the point appears twice at the initial position. Therefore it is judged that the first cylinder (A≠0) and the cylinder in which ignition occurred two ignition cycles later, namely, the third cylinder, misfired. If the first and the fourth cylinder misfired, a point appears three times at the initial position. Therefore it is judged that the first cylinder (A≠0) and the cylinder in which ignition occurred three ignition cycles later, namely, the third cylinder, misfired.

After the decision has been made, the count of the total misfire counter is incremented by the number of the misfired cylinders (the number of misfires), and the count of a counter for the relevant cylinder is incremented in step S20.

In step S21, the count of the total misfire counter is checked, for example, every 1000 rotations of the crankshaft (4000 ignition cycles). If the count is not smaller than a threshold CR, step S22 is executed to give a warning to the driver, and information about misfiring including the numbers of the misfired cylinders, the operating condition of the engine when a decision is made that the engine is misfiring and the mode of misfiring (regular misfiring mode or low-frequency misfiring mode), and then the procedure is ended. When the count of the total misfire counter is less than the threshold CR, the procedure is ended.

Figure 21:
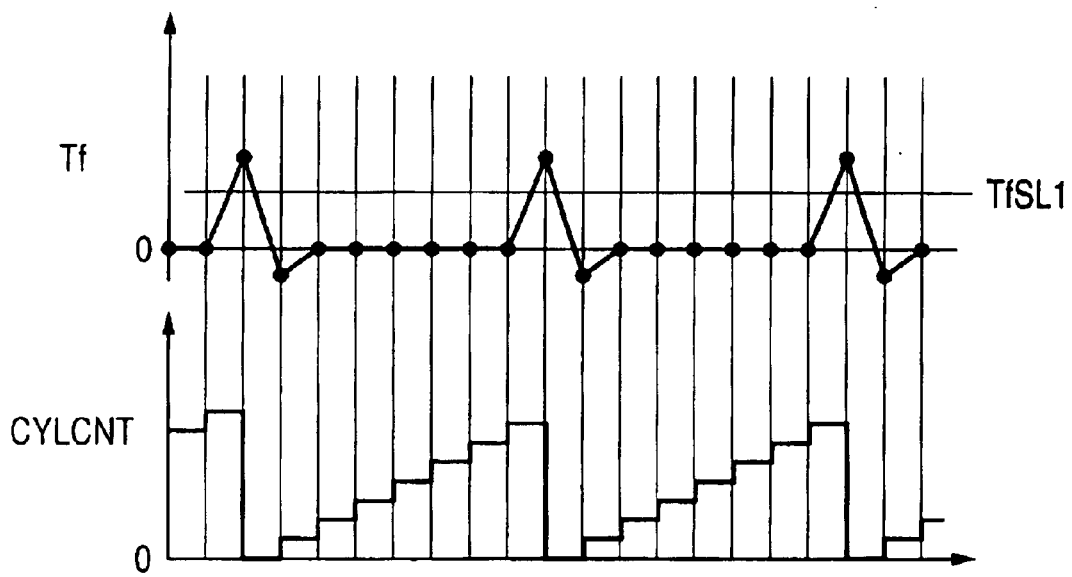
FIG. 21 is a diagrammatic view of assistance in explaining Tf and such.

A method of identifying the misfiring cylinders when the engine is operating in the regular misfiring mode in an embodiment will be described hereinafter. If Tf exceeds a threshold TfSL1 as shown in FIG. 21, it is judged that the cylinder is misfiring, and the misfired cylinder is identified by CYLCNT. The number of the identified misfired cylinders is regarded as the number of misfires. This misfired cylinder identifying operation is executed every two rotations of the crankshaft (eight ignition cycles). The threshold TfSL1 is determined on the basis of engine speed and load. Since the threshold TfSL1 is not greatly dependent on engine speed, the threshold TfSL1 may be determined on the basis of only load. Since this operation is susceptible to the pitch errors in the ring gear when engine speed is high, the method is carried out after the completion of leering the pitch errors or TfSL1 is increased by corrections proportional to engine speed until the learning of the pitch errors is completed. The threshold TfSL1 is set to a relatively large value even if the learning of the pitch errors is completed to avoid judging that the normally operating cylinders are misfiring because the accuracy of misfire detection is not very high while the engine is operating at a high engine speed under a low load. If any cylinders exceeding TfSL1 are not found, it is judged that the number of misfired cylinders (the number of misfires) is 1 because it has been found that at least one of the cylinders is misfiring in the regular misfiring mode, and the misfired cylinder identifying operation is not executed.

If the cylinder is misfiring in the regular misfiring mode, the misfired cylinder is identified, and if misfiring is due to the malfunction of the ignition system, the unburned fuel is discharged into the exhaust system, burns in the catalytic unit. Consequently, the catalytic unit is heated excessively and deteriorated and the unburned gas is discharged into the atmosphere. Therefore, it is preferable to stop supplying the fuel to the cylinder misfiring in the regular misfiring mode. When the engine is operating under a high load, it is preferable to supply the fuel at an increased rate to the cylinders not misfiring to reduce the $No_x$ concentration of the exhaust gas, because only intake air is discharged into the exhaust system, surplus oxygen is supplied to the catalytic unit to reduce $No_x$ conversion efficiency if the supply of the fuel to the misfiring cylinder is stopped and hence it is preferable to reduce the $No_x$ concentration of the exhaust gas before the exhaust gas flows into the catalytic unit.

A method of identifying the cylinder misfiring in the regular misfiring mode in another embodiment will be described hereinafter.

Figure 22:
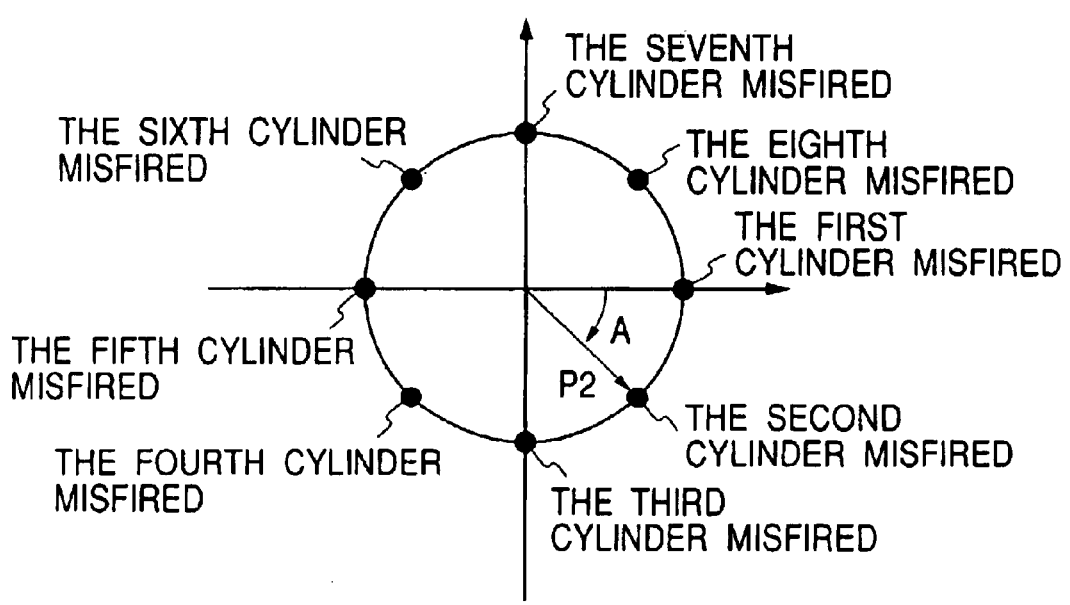
FIG. 22 is a diagrammatic view of assistance in explaining the behavior of two-rotation period component when a misfire occurred.
Figure 23:
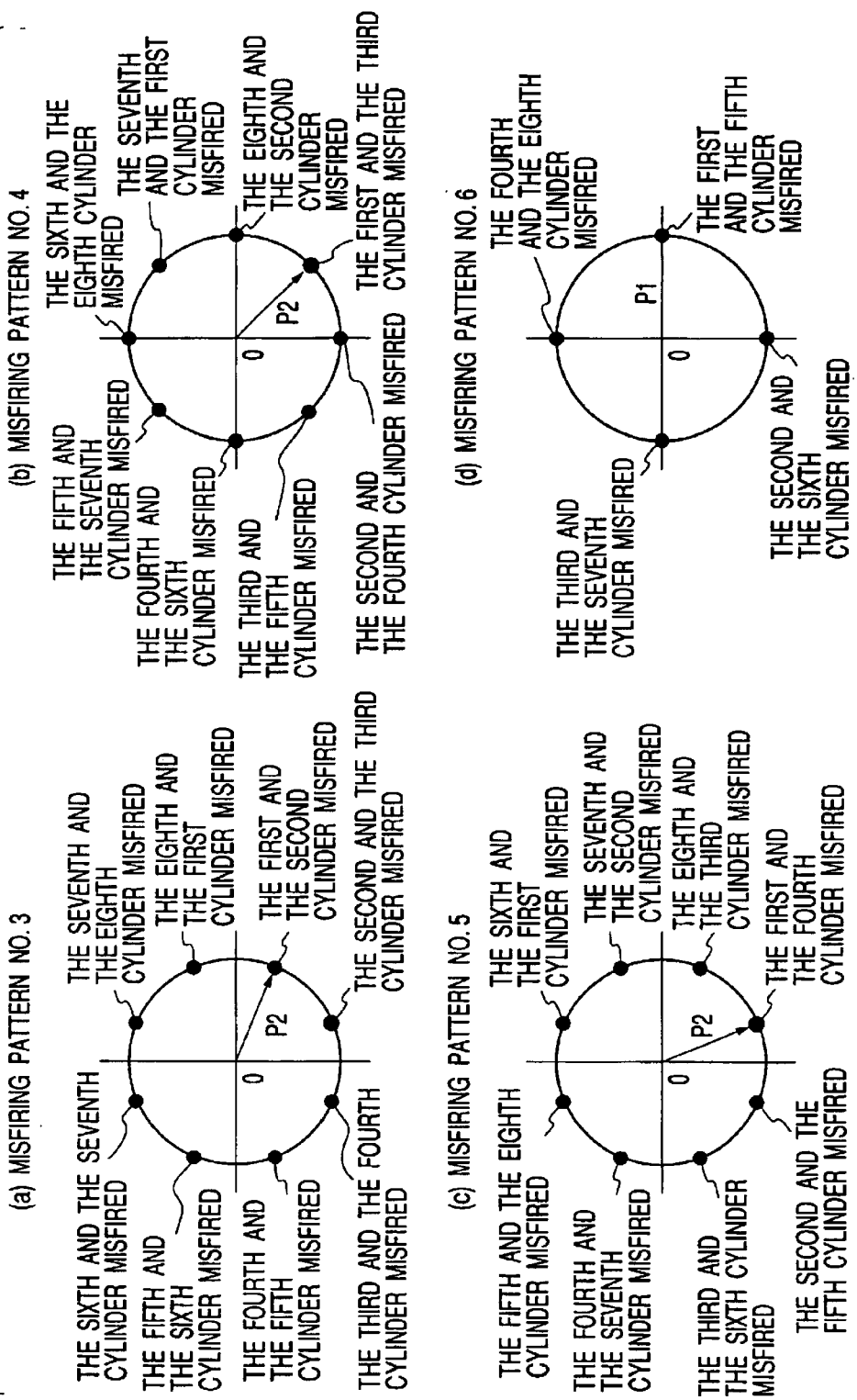
FIG. 23 is a diagrammatic view of assistance in explaining the behavior of a specific rotation period component when a misfire occurred.

The sum of the ½-rotation period component, the ⅔-rotation period component, the one-rotation period component and the two-rotation period component is equal to a value corresponding to the number of misfiring cylinders. Therefore, the sum is compared with a predetermined threshold to judge the number of the misfiring cylinders. Since the sum is dependent on engine speed and load, the threshold is determined on the basis of engine speed and load. If it is known that one of the cylinders is misfiring in the regular misfiring mode, the misfiring cylinder is identified by the phase angle A of P2 because different misfiring cylinders have different phase angles A of P2, respectively, as shown in FIG. 22. If it is judged that the two cylinders are misfiring, the misfiring pattern is judged by comparing P2 with a predetermined threshold because the different misfiring pattern Nos. 3 to 6 have different P2, respectively. Since the value of P2 is dependent on engine speed and load, the threshold is determined on the basis of engine speed and load. Since the different misfiring cylinders have different phase angles of P1 and P2, respectively, for each misfiring pattern as shown in FIG. 23, the misfiring cylinder is identified by the phase angles of P1 and P2 after the misfiring pattern has been judged. If the three or more cylinders are misfiring, the misfiring cylinders are not identified and only the number of the misfiring cylinders are judged.

A method of identifying the misfiring cylinder misfiring in the regular misfiring mode in a third embodiment will be described hereinafter. After a decision has been made that some cylinders are misfiring in the regular misfiring mode, the supply of furl to the cylinders is stopped for one cylinder at a time and the variation of P2 and P1 is examined. If P2 and P1 do not vary, it is judged that the associated cylinder is misfiring.

The foregoing methods may be used in combination. For example, the number of the misfiring cylinders may be judged on the basis of the sum of the ½-rotation period component, the ⅔-rotation period component, the one-rotation period component and the two-rotation period component, the supply of the fuel to the cylinders which are identified to be misfiring cylinders is stopped to examine the variation of P2 and P1, and a final decision that the cylinder is misfiring may be made when P2 and P1 do not vary or that the cylinder is not misfiring and the former misfiring cylinder identification may be canceled when P2 and P1 vary.

Figure 24:
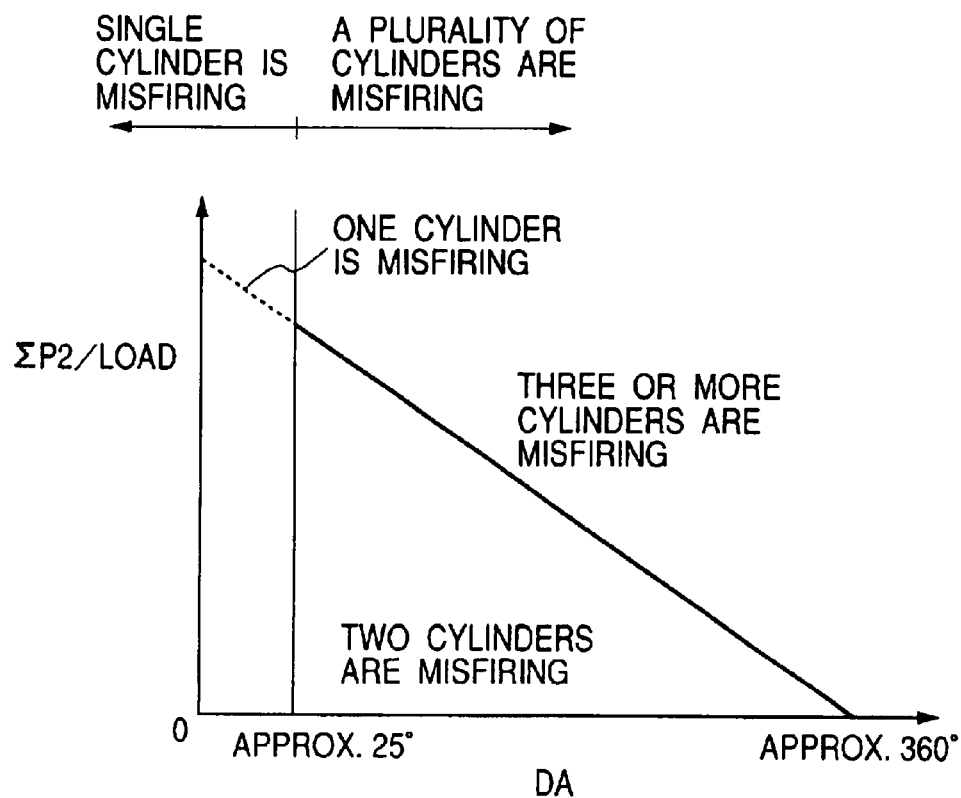
FIG. 24 is a graph of assistance in explaining a misfired cylinder identifying method.

A misfiring cylinder identifying method for the low-frequency misfiring mode (step S19 in FIG. 6) in another embodiment will be described hereinafter. This method determines only the number of the misfiring cylinders. FIG. 24 is a graph showing the relation between the quotient of division of ΣP2, i.e., the sum of the values of P2 in the preceding eight ignition cycles, by load and the phase angle change DA of P2. In FIG. 24, the range of phase angle change is divided into sections by the number of the misfiring cylinders (the number of misfires). Therefore, the number of the misfiring cylinders can be known from the section in which the phase angle change. As mentioned above, it is judged that only one of the cylinders is misfiring if DA is less than, for example 25°. Therefore it is judged that the plurality of cylinders are misfiring if DA is not smaller than 25°, and the number of the misfiring cylinders is judged on the basis of the region shown in FIG. 24.

A method of identifying the misfired cylinders in an embodiment will be described hereinafter. This method is applicable to either the low-frequency misfiring mode (one of the cylinders is misfiring or the plurality of cylinders are misfiring) or the regular misfiring mode. A plurality of weighting coefficients are determined beforehand for various misfiring patterns as shown in FIG. 8. For example, the coefficient for the misfiring state is 1 and the coefficient for the normal combustion state is 0 to facilitate calculations. Then, the coefficient for the misfiring pattern No. 2 is 1,0,0,0,0,0,0,0, and the coefficient for the misfiring pattern No. 3 is 1,1,0,0,0,0,0,0. The sum of the products of the coefficients and Tf(i) are calculated every two rotations of the crankshaft, and a decision is made that the pattern having the maximum sum is the actual misfiring pattern. The cylinder having the coefficient corresponding to 1 is identified to be a misfiring cylinder. The pattern need not be the two rotations of the crankshaft and may a pattern for one rotation of the crankshaft, and the identification of the misfiring cylinders may be identified every rotation of the crankshaft. Weighting coefficients other than the foregoing weighting coefficients may be used. The use of weighting coefficients determined on the basis of data about actual misfires will improve the identification accuracy. Although this embodiment was explained as applied to the identification of the misfired cylinders after misfires have occurred, the method can be applied to the detection of misfires when combustion state diagnosis is executed on the basis of torque, in which the influence of measuring errors is not significant. It is judged that the engine is in the normal combustion state if all the sums of products for the patterns are within a predetermined range, and a decision is made that the pattern having the maximum sum among the misfiring patterns other than predetermined patterns is the actual misfiring pattern if all the sums of products for the patterns are outside the predetermined range.

Figure 25:
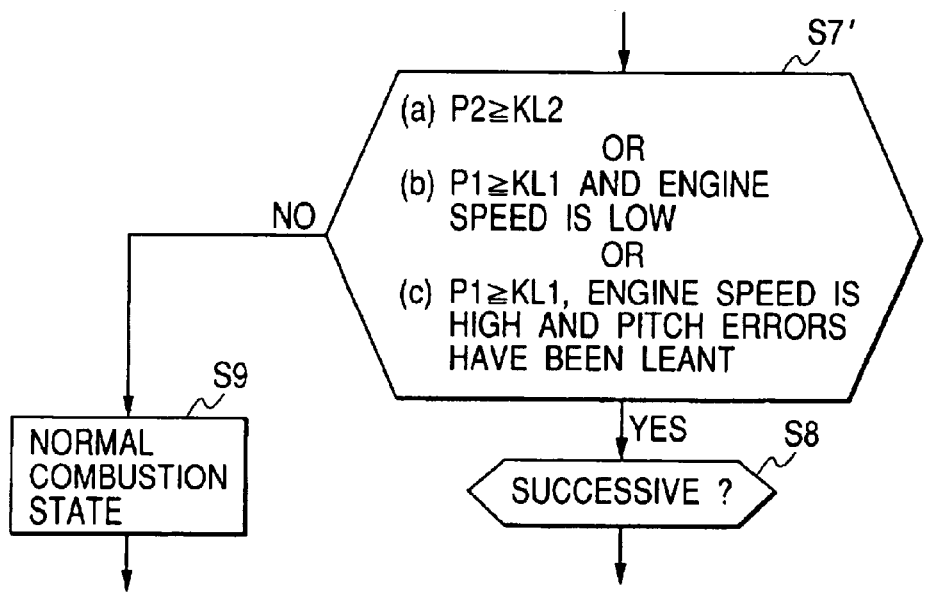
FIG. 25 is part of a flow chart of a procedure in another embodiment according to the present invention.

Another embodiment will be described. Basically, step S7' of this embodiment differs from step S7 of the embodiment previously described with reference to FIG. 6. FIG. 25 shows part of the embodiment different from that shown in FIG. 6. The following conditions are used for judging combustion state on the basis of the specific rotation period components. Queries are mode in step S7' to see (a) if the two-rotation period component P2 is not smaller than the predetermined threshold KL2, (b) if the one-rotation period component P1 is not smaller than the predetermined threshold KL1 when the engine is operating at a low engine speed, and (c) if the one-rotation period component P1 is not smaller than the predetermined threshold KL1 when the learning of the pitch errors in the ring gear is completed and the engine is operating at a high engine speed. If the response to any one of the queries about (a), (b) and (c) is affirmative, it is judged that the engine is misfiring and the procedure goes to step S8. If the response to none of the queries about (a), (b) and (c) is affirmative, it is judged that the engine is not misfiring and the procedure goes to step S9, in which it is judged that the engine is operating in the normal combustion mode. Because the influence of the pitch errors in the ring gear on P1 is insignificant when the engine speed is low and P1 can be used for making the decision even if the learning of the pitch errors is not completed. Low engine speeds are in the range of 2000 to 3000 rpm.

It is preferable to change the width and the position of the engine speed measuring section according to the specific rotation period components to be extracted. For example, the width is reduced to place importance on the gain for P2 because the two-rotation period component P2 is not susceptible to the influence of the pitch errors in the ring gear, and the width is increased for the one-rotation period component P1 to place importance on the reduction of errors.

An embodiment to interrupt diagnosis will be explained hereinafter. The following method is proposed in addition to the foregoing diagnostic conditions.

Figure 26:
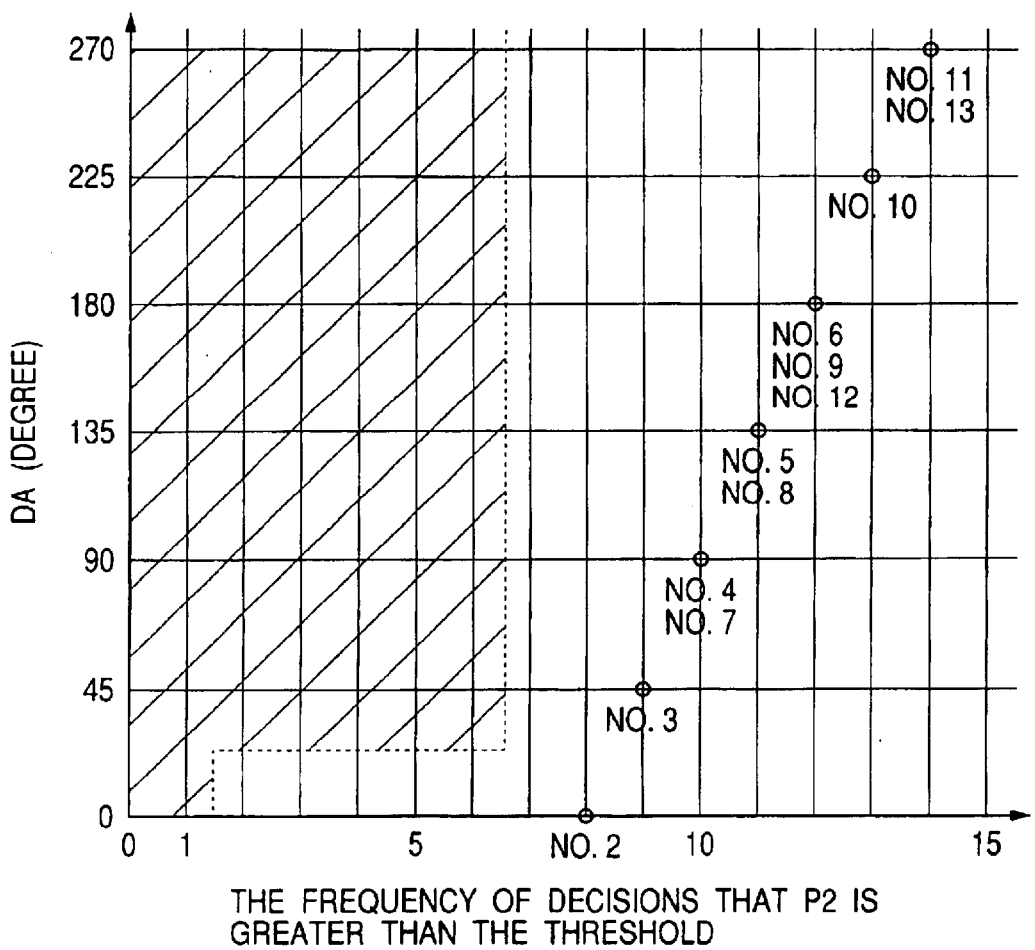
FIG. 26 is a diagrammatic view of assistance in explaining a method of interrupting diagnosis.

FIG. 26 is a graph showing the relation between the frequency of decisions that P2 is greater than the predetermined threshold made in step S7 of FIG. 6 when misfires occur at a low frequency, and the phase angle change DA of P2 during that time. In FIG. 26, numbers are the misfiring pattern numbers shown in FIG. 8. In an ordinary misfiring mode, points indicating misfiring patterns are outside a shaded region, and the points often lie in the shaded region if the engine undergoes disturbance in such a case where the vehicle travels on a rough road. Therefore, it is judged that faulty misfire detection is made due to disturbance and the procedure is interrupted to suspend the diagnosis for a predetermined time. Points when a misfire occurred shown in FIG. 26 are at positions in an ideal state. Actually, the points are scattered and an allowance is set so that the points may not lie in the shaded region when a misfire occurs. The shape of the shaded region may be determined so that the points may not lie therein when a misfire occurs and may be other than that shown in FIG. 26.

Figure 27:
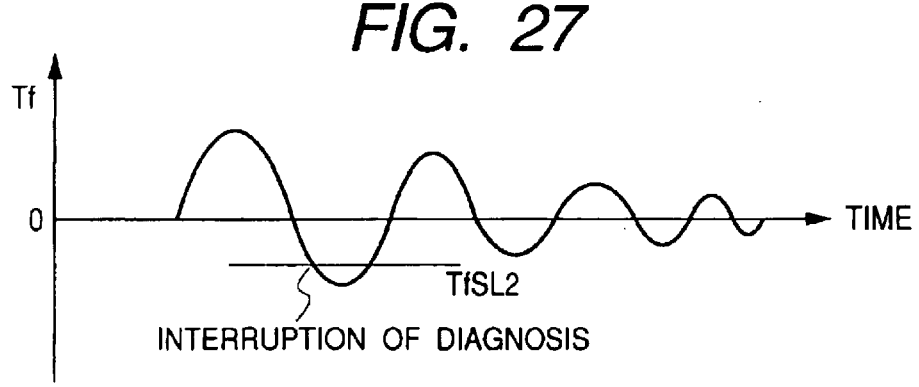
FIG. 27 is a diagram showing the behavior of Tf, by way of example, when the engine undergoes disturbance.

Another embodiment to interrupt diagnosis will be explained. When the engine undergoes disturbance, Tf leans to the negative side (accelerating side) as shown in FIG. 27. If Tf leans to the negative side beyond a threshold TfSL2, the diagnostic operation is interrupted. Basically, Tf leans only to the positive side (decelerating side) when a misfire occurs and leans scarcely to the negative side. Accordingly, the absolute value of the threshold TfSL2 must be greater than that of Tf when a misfire occurs. The variation of Tf when a misfire occurs is dependent on engine speed and load, the threshold TfSL2 is determined on the basis of engine speed and load. Since Tf is not greatly dependent on engine speed, the threshold TfSL2 may be determined only on the basis of load. The base phase angle $A_{base}$ of P2 explained with reference to FIG. 18 starts from 0° when a misfire occurs, but the same starts from, for example, −180° when the engine undergoes disturbance. Therefore, the diagnosis may be interrupted if the base phase angle $A_{base}$ is greater than a predetermined angle than 0°.

Figure 28:
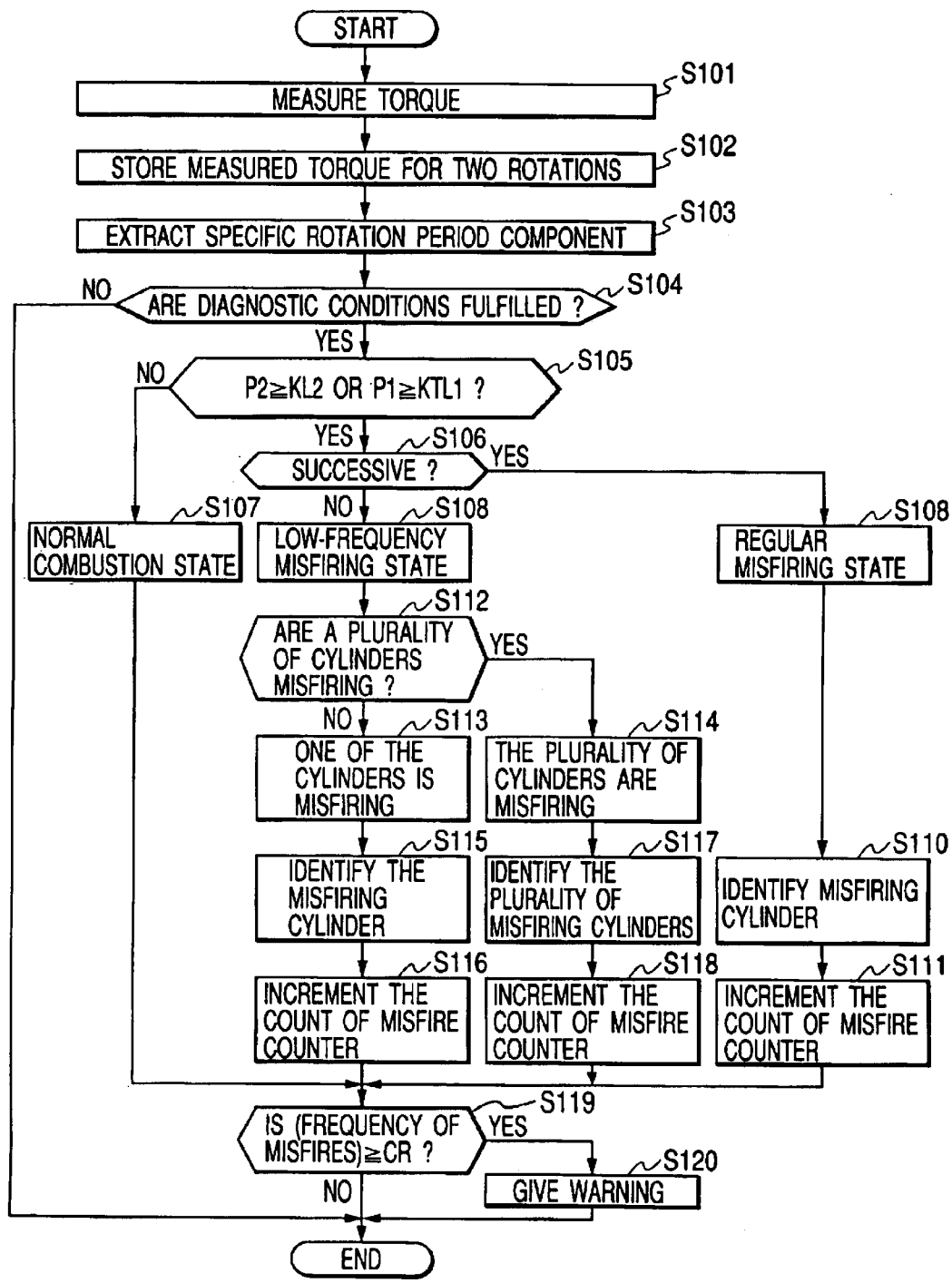
FIG. 28 is a flow chart of a procedure in a further embodiment according to the present invention.

The method of diagnosing a combustion state in the foregoing embodiment diagnosis a combustion state on the basis of engine speed. A method of diagnosing a combustion state in another embodiment which diagnosis a combustion state on the basis of torque will be described hereinafter. The method in this embodiment is similar to the previously described method in the foregoing embodiment in many respects and hence only functions of the former different from the latter will be described. FIG. 28 is a flow chart of a procedure to be executed by the method in this embodiment. The procedure is started, similarly to that shown in FIG. 6, in synchronism with a combustion cycle.

Torque is measured in step S101. Torque may be an instantaneous torque measured when the crankshaft is at a predetermined crank angle, such as a crank angle 30° after the combustion top dead center, or the mean of torque measured while the crankshaft turns through an angular range between predetermined crank angles. Torque may be measured once or N times every one combustion cycle. In step S102, the specific rotation period component is extracted. If torque is used as data for combustion state diagnosis, combustion state diagnosis is not affected by the pitch errors in the ring gear, and the correction for the necessary time can be ignored and the measured torque may be used for directly combustion state diagnosis. The torque is substantially zero if a misfire occurs and is a positive value corresponding to the load while the engine is operating in the normal combustion mode. The torque increases monotonously during acceleration or decreases monotonously during deceleration. Since the effect of components of long periods on the torque is insignificant unless the torque changes sharply, low-frequency components need not be removed. Naturally, it is preferable to remove low-frequency components.

The measured values of torque measured in step S102 while the crankshaft rotates twice are stored in a storage device, and the specific rotation period component is extracted in step S103. If it is judged in step S104 that diagnostic conditions are fulfilled, the combustion state of the engine is diagnosed on the basis of the specific rotation period component in step S105. Since the influence of the pitch errors in the ring gear on the measured torque is insignificant as mentioned above, the one-rotation period component may be used without learning the pitch errors.

The rest of steps of the procedure are the same as those of the previously described procedure for combustion state diagnosis based on engine speed. When a misfire occurs, Tf is a positive value (T increases) and torque decreases. Thus, Tf and torque lean toward opposite directions, the phase angle $A_{base}$ of P2 and the value of A in this procedure are different from those in the previously described procedure.

Although the misfire diagnosing methods have been described as the preferred embodiments of the combustion state diagnosing method of the present invention, the present invention is not limited in its practical application to those embodiments. For example, the threshold employed in judging a combustion state on the basis of the specific rotation period component may be smaller than the threshold for judging if a misfire occurred to enable the decision of a state in which the engine is not misfiring but the mode of combustion is unsatisfactory.

Although the foregoing embodiments employ information about engine speed or torque as a parameter characterizing combustion state, the parameter need not be limited thereto. For example, the pressure in the combustion chamber of the engine, the oxygen concentration of the exhaust gas (output signal of an oxygen concentration sensor) or the vibration of the engine may be used as the parameter.

The combustion state diagnosing system extracts the specific rotation period component relating to abnormal combustion including misfiring from the parameter of combustion state, such as information about the variation of engine speed, and judges a combustion state on the basis of the extracted specific rotation period component in a high accuracy.

What is claimed is:

1. A combustion state diagnosing system for diagnosing a combustion state of a multiple-cylinder engine by measuring a parameter of the combustion state varying according to the combustion state of the engine and diagnosing the combustion state on the basis of the parameter of the combustion state, comprising:

a combustion state parameter measuring means which measures values of the parameter of the combustion state N times (at least once) in one ignition cycle of the multiple cylinder engine at times corresponding to a predetermined crank angle;

a specific rotation period component extracting means for extracting a specific rotation period component of a period synchronous with rotation of a crankshaft from values of the parameter of the combustion state measured by the combustion state parameter measuring means at least in two rotations of a crankshaft; and a combustion state judging means for judging the combustion state on the basis of the specific rotation period component extracted by the specific rotation period component extracting means to detect low frequency cylinder misfiring.

2. The combustion state diagnosing system for diagnosing combustion state of a multiple-cylinder engine according to claim 1, wherein the combustion state parameter measuring means measures necessary times T(i) each necessary for the crankshaft to turn through an angle between predetermined crank angles N times in each ignition cycle of the engine, and the specific rotation period component extracting means is provided with a high-pass filter means which filters out low-frequency components of the necessary times T(i) to calculate filtered necessary times Tf(i) to extract specific rotation period components of a period synchronous with the rotation of the crankshaft from the filtered necessary times Tf(i).

3. The combustion state diagnosing system for diagnosing combustion state of a multiple-cylinder engine according to claim 2, wherein the high-pass filter means filters out the components of periods longer than a time necessary for two rotations of the crankshaft of the engine.

4. The combustion state diagnosing system for diagnosing combustion state of a multiple-cylinder engine according to claim 2, wherein the high-pass filter means calculates the difference (T(i)−T(i−N)) from the necessary times T(i) corresponding to the cylinders successive in ignition order to use the same as the filtered necessary time Tf(i).

5. The combustion state diagnosing system for diagnosing combustion state of a multiple-cylinder engine according to claim 1, wherein the measured varying values of torque are used directly as those of the combustion state parameter.

6. The combustion state diagnosing system for diagnosing combustion state of a multiple-cylinder engine according to claim 1, wherein the specific rotation period component extracting means is provided with an arithmetic means which extracts a specific rotation period component which is a variable component of X(=Tf) of a period synchronous with the rotation of the crankshaft from the sum of the products of values of the combustion state parameter for at least two rotations of the crankshaft or Tf (=X), i.e., X(i), X(i−1) . . . , X(i−C+1), where c is greater than or equal to the product of N and the number of cylinders of the engine, and at least two sets each of c pieces of weighting coefficients.

7. The combustion state diagnosing system for diagnosing combustion state of a multiple-cylinder engine according to claim 6, wherein the weighting coefficients are set so as to extract a two-rotation period component of a period synchronous with two rotations of the crankshaft of the engine.

8. The combustion state diagnosing system for diagnosing combustion state of a multiple-cylinder engine according to claim 1, wherein the specific rotation period component extracting means extracts components synchronous with two rotations of the crankshaft of the engine.

9. The combustion state diagnosing system for diagnosing combustion state of a multiple-cylinder engine according to claim 1, wherein the specific rotation period component extracting means extracts components synchronous with one rotation of the crankshaft of the engine.

10. The combustion state diagnosing system for diagnosing combustion state of a multiple-cylinder engine according to claim 1, wherein the combustion state judging means counts the frequency of successive values of the specific rotation period component exceeding a predetermined value, judges that a misfire occurred every ignition cycle if the count of the frequency is greater than a predetermined number, and judges that a misfire occurred at intervals if the count of the frequency is not greater than the predetermined value.

11. The combustion state diagnosing system for diagnosing combustion state of a multiple-cylinder engine according to claim 1, wherein the specific rotation period component extracting means includes a phase calculating means for calculating the phase of the specific rotation period component, and the combustion state judging means includes a misfiring cylinder identifying means for finding the number of misfiring cylinders and/or misfiring cylinders on the basis of at least the phase of the specific rotation period component.

12. The combustion state diagnosing system for diagnosing combustion state of a multiple-cylinder engine according to claim 1, wherein the combustion state judging means specifies a pattern, including a maximum from the sum of the products of a plurality of values of the combustion state parameters or $Tf(=X)$, i.e., $X(i), X(i-1), \ldots, X(i-d+1)$, where d is a constant, and d pieces of weighting coefficients, for a plurality of predetermined patterns, when it is judged that a misfire occurred, and identifies a misfiring cylinder on the basis of the maximum and the specified pattern.

13. The combustion state diagnosing system for diagnosing combustion state of a multiple-cylinder engine according to claim 1 further comprising a misfire counting means for counting the frequency of judgment that a misfire occurred made by the combustion state judging means in a predetermined period, and an alarm means for giving an alarm to the driver when the frequency exceeds a predetermined number and/or a misfire information storage means for storing misfire information.

14. An engine combustion state diagnosing program storage medium storing a program for measuring a combustion state parameter varying according to the combustion state of a multiple-cylinder engine, such as engine speed at which the multiple-cylinder engine is operating or output torque of the multiple-cylinder engine and judging combustion state on the basis of the combustion state parameter, comprising measuring the combustion state parameter N times at least once in one ignition cycle of each cylinder at a predetermined crank angle, extracting a specific rotation period component of a period synchronous with rotation from at least the two values of the combustion state parameter, and judging combustion state on the basis of the extracted specific rotation period component.

* * * * *